United States Patent
Zhang et al.

(10) Patent No.: US 11,799,818 B2
(45) Date of Patent: Oct. 24, 2023

(54) INTERACTION MESSAGE PROCESSING METHOD AND APPARATUS, COMPUTER DEVICE, AND STORAGE MEDIUM

(71) Applicant: Tencent Technology (Shenzhen) Company Limited, Shenzhen (CN)

(72) Inventors: Yan Zhang, Shenzhen (CN); Jian Liu, Shenzhen (CN); Wei Liu, Shenzhen (CN); Randy Zhong, Shenzhen (CN); Qiuge Liu, Shenzhen (CN); Cheng Niu, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/727,642

(22) Filed: Apr. 22, 2022

(65) Prior Publication Data

US 2022/0247708 A1 Aug. 4, 2022

Related U.S. Application Data

(63) Continuation of application No. 17/320,005, filed on May 13, 2021, now Pat. No. 11,343,221, which is a
(Continued)

(30) Foreign Application Priority Data

Mar. 26, 2019 (CN) .......................... 201910233186.8

(51) Int. Cl.
*H04L 51/52* (2022.01)
*G06F 40/30* (2020.01)
(Continued)

(52) U.S. Cl.
CPC .............. *H04L 51/52* (2022.05); *G06F 40/30* (2020.01); *G06N 5/02* (2013.01); *H04L 51/18* (2013.01); *G06Q 50/01* (2013.01)

(58) Field of Classification Search
CPC ......... H04L 51/32; H04L 51/18; H04L 51/52; G06F 40/30; G06F 17/2785;
(Continued)

(56) References Cited

U.S. PATENT DOCUMENTS 10,257,143 B2   4/2019   Simpson et al.
2007/0250833 A1 10/2007  Araujo, Jr. et al.
(Continued)

FOREIGN PATENT DOCUMENTS

CN   107229526 A   10/2017
CN   107977183 A   5/2018
(Continued)

OTHER PUBLICATIONS

Tencent Technology, ISRWO, PCT/CN2020/079214, Jun. 12, 2020, 6 pgs.
(Continued)

*Primary Examiner* — Soe Hlaing
(74) *Attorney, Agent, or Firm* — Morgan, Lewis & Bockius LLP

(57) ABSTRACT

A method is performed at a backend server. The server receives a to-be-processed interaction message from a user interface of a social network platform. The server performs intention classification on the to-be-processed interaction message, to obtain an intention classification result of the to-be-processed interaction message. The server performs semantic analysis on the to-be-processed interaction message when the intention classification result comprises a mini program intention, to determine a message keyword of the to-be-processed interaction message. The server deter-
(Continued)

mines a program identifier of a target mini program corresponding to the to-be-processed interaction message according to the message keyword. The server transmits a message processing result based on the program identifier of the target mini program.

14 Claims, 10 Drawing Sheets

Related U.S. Application Data continuation of application No. PCT/CN2020/079214, filed on Mar. 13, 2020.

(51) Int. Cl.
   *G06N 5/02* (2023.01)
   *H04L 51/18* (2022.01)
   *G06Q 50/00* (2012.01)

(58) Field of Classification Search
   CPC ......... G06F 9/4484; G06F 9/451; G06N 5/02; G06N 3/045; G06N 3/08; G06Q 50/01
   See application file for complete search history.

(56) References Cited

U.S. PATENT DOCUMENTS

| | | |
|---|---|---|
| 2012/0158806 A1 | 6/2012 | Snyder et al. |
| 2013/0144961 A1 | 6/2013 | Park et al. |
| 2016/0379106 A1 | 12/2016 | Qi et al. |
| 2017/0005967 A1 | 1/2017 | Simpson et al. |
| 2017/0132019 A1 | 5/2017 | Karashchuk et al. |
| 2017/0187654 A1 | 6/2017 | Lee |
| 2017/0295114 A1* | 10/2017 | Goldberg ................ H04W 4/12 |
| 2018/0174222 A1* | 6/2018 | Venkatakrishnan .... H04L 51/02 |
| 2021/0350209 A1* | 11/2021 | Wang ....................... G06N 3/08 |
| 2021/0358496 A1* | 11/2021 | Sukumar ................. G10L 15/08 |

FOREIGN PATENT DOCUMENTS

| | | |
|---|---|---|
| CN | 108352006 A | 7/2018 |
| CN | 109036397 A | 12/2018 |
| JP | 2013117938 A | 6/2013 |
| JP | 2017010517 A | 1/2017 |
| KR | 20170001550 A | 1/2017 |
| WO | WO 2018057537 A1 | 3/2018 |

OTHER PUBLICATIONS

Tencent Technology, IPRP, PCT/CN2020/079214, Sep. 28, 2021, 4 pgs.
Tencent Technology, KR Office Action, Korean Patent Application No. 10-2021-7013964, dated Nov. 29, 2022, 15 pgs.
Tencent Technology, JP Office Action, Japanese Patent Application No. 2021-522073, dated Dec. 23, 2022, 10 pgs.

* cited by examiner

INTERACTION MESSAGE PROCESSING METHOD AND APPARATUS, COMPUTER DEVICE, AND STORAGE MEDIUM

CROSS REFERENCE TO RELATED APPLICATIONS

This application is a continuation application of U.S. patent application Ser. No. 17/320,005, filed May 13, 2021, which claims priority to PCT Patent Application No. PCT/CN2020/079214, entitled "INTERACTIVE MESSAGE PROCESSING METHOD AND APPARATUS, COMPUTER DEVICE AND STORAGE MEDIUM" filed on Mar. 13, 2020, which claims priority to Chinese Patent Application No. 2019102331868, filed with the State Intellectual Property Office of the People's Republic of China on Mar. 26, 2019, and entitled "INTERACTION MESSAGE PROCESSING METHOD AND APPARATUS, COMPUTER DEVICE, AND STORAGE MEDIUM", all of which are incorporated herein by reference in their entirety.

FIELD OF THE TECHNOLOGY

This application relates to the field of artificial intelligence (AI) technologies, and in particular, to an interaction message processing method and apparatus, a computer device, and a storage medium.

BACKGROUND OF THE DISCLOSURE

AI is a novel technical science that studies and develops a theory, method, technology, and application system to simulate, extend, and expand human intelligence. With the rapid development of information technologies, AI has been applied to various aspects of life and can provide an intelligent dialogue service for users. For example, there are various dialogue applications, dialogue devices, and dialogue service platforms, such as "Classmate AI" and "AI chatbot Qianxun".

An interaction message processing method in a conventional intelligent dialogue service can provide a simple message dialogue function, which needs to be further expanded. Therefore, user stickiness of the interaction message processing method needs to be further increased.

SUMMARY

Embodiments of this application provide an interaction message processing method and apparatus, a computer device, and a storage medium, which can expand an interaction message processing function and increase user stickiness. The technical solutions are as follows:

According to an aspect, an interaction message processing method is provided, is performed at an electronic device (e.g., a terminal), the method comprising:
receiving, in a user interface of a social network platform, a to-be-processed interaction message;
transmitting a message processing request based on the to-be-processed interaction message to a remote server, wherein the remote server identifies one or more target mini application programs based on semantic analysis of the to-be-processed interaction message;
receiving, from the remote server, a message processing result in accordance with the message processing request, the message processing result including one or more links to the target mini application programs running on the social network platform; and
displaying, in the user interface of the social network platform, a target interaction message for each target mini application program according to the message processing result.

According to another aspect, an interaction message processing method performed at a backend server is provided, the method including:
receiving a to-be-processed interaction message from a user interface of a social network platform;
performing intention classification on the to-be-processed interaction message, to obtain an intention classification result of the to-be-processed interaction message;
performing semantic analysis on the to-be-processed interaction message when the intention classification result includes a mini application program intention, to determine a message keyword of the to-be-processed interaction message;
determining a program identifier of a target mini application program corresponding to the to-be-processed interaction message according to the message keyword; and
transmitting a message processing result based on the program identifier of the target mini application program.

According to another aspect, an interaction message processing apparatus (e.g., an electronic device) is provided, the apparatus including:
an interaction message receiving module, configured to receive a to-be-processed interaction message when a message input trigger instruction is received in a target interaction interface;
a message display and transmission module, configured to display the to-be-processed interaction message in the target interaction interface when a message transmission trigger instruction is received in the target interaction interface, and transmit a message processing request based on the to-be-processed interaction message;
a message result receiving module, configured to receive a message processing result returned based on the message processing request, the message processing result being determined based on a target mini application program corresponding to the to-be-processed interaction message; and
a target message display module, configured to display a target interaction message based on the target mini application program in the target interaction interface according to the message processing result.

According to another aspect, an interaction message processing apparatus is provided, the apparatus including:
an interaction message receiving module, configured to receive a to-be-processed interaction message;
a message intention classification module, configured to perform intention classification on the to-be-processed interaction message, to obtain an intention classification result of the to-be-processed interaction message;
a message semantic analysis module, configured to perform semantic analysis on the to-be-processed interaction message in a case that the intention classification result includes a mini application program intention, to determine a message keyword of the to-be-processed interaction message;
a target program determining module, configured to determine a program identifier of a target mini application program corresponding to the to-be-processed interaction message according to the message keyword; and a message result transmission module, configured to transmit a message processing result based on the program identifier of the target mini application program.

According to another aspect, a computer device (e.g., an electronic device, a terminal etc.) is provided. The computing device includes memory and one or more processors. The memory stores one or more computer programs that, when executed by the one or more processors, cause the one or more processors to perform any of the methods disclosed herein.

According to another aspect, a computer device is provided, including a memory and a processor, the memory storing a computer program, and the processor, when executing the computer program, implementing the interaction message processing method performed by a backend server according to the foregoing aspect.

According to another aspect, a non-transitory computer-readable storage medium is provided, storing a computer program, the computer program being executed by a processor, to implement any of the methods disclosed herein.

According to another aspect, a non-transitory computer-readable storage medium is provided, storing a computer program, the computer program being executed by a processor, to implement the interaction message processing method performed by a backend server according to the foregoing aspect.

The technical solutions provided in the embodiments of this application achieve at least the following beneficial effects:

According to the interaction message processing method and apparatus, the computer device, and the storage medium, a terminal may display a target interaction message based on a target mini application program in a target interaction interface, so that an interaction message processing function can be expanded and user stickiness can be increased. Besides, due to the limitation of mini application program obtaining manners, according to the interaction message processing method and apparatus, the computer device, and the storage medium, the quantity of uses of the mini application program can be improved. In addition, a closed-loop of operations is easily formed based on the interaction message processing method and apparatus, the computer device, and the storage medium of this embodiment, which helps to collect statistics on traffic revenue.

BRIEF DESCRIPTION OF THE DRAWINGS

To describe the technical solutions in the embodiments of this application more clearly, the following briefly introduces the accompanying drawings required for describing the embodiments. Apparently, the accompanying drawings in the following description show merely some embodiments of this application, and a person of ordinary skill in the art may still derive other accompanying drawings from these accompanying drawings without creative efforts.

DESCRIPTION OF EMBODIMENTS

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

Figure 1:
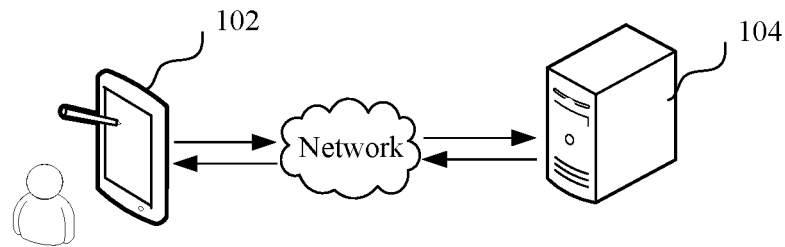
FIG. 1 is a schematic diagram of an application environment of an interaction message processing method according to some embodiments of this application.

FIG. 1 is a schematic diagram of an application environment of an interaction message processing method according to an embodiment. The interaction message processing method provided in this application is applicable to the application environment shown in FIG. 1. A terminal 102 communicates with a backend server 104 through a network.

An interaction message processing method according to an embodiment of this application may be run on the terminal 102. The terminal 102 receives a to-be-processed interaction message when a message input trigger instruction is received in a target interaction interface; displays the to-be-processed interaction message in the target interaction interface when a message transmission trigger instruction is received in the target interaction interface, and transmits a message processing request based on the to-be-processed interaction message; receives a message processing result returned based on the message processing request, the message processing result being determined based on a target mini application program corresponding to the to-be-processed interaction message; and displays a target interaction message based on the target mini application program in the target interaction interface according to the message processing result. The interaction message processing method may be implemented by using an application, or may be implemented by using a public service platform in an application, or may be implemented by using a sub-application in an application. In a specific embodiment, the application may be a social platform such as WeChat. The public service platform may be service platforms such as an official account, a subscription, and a service, for example, an AI chatbot Qianxun. The sub-application refers to an application that can be used without being downloaded and installed, or the sub-application refers to an application of which a setup package is quite small and a downloading and installation process can be automatically completed in the background, such as a mini application program. Sub-applications such as mini application programs may be embedded in an application of a terminal, and corresponding services may be provided for a user by running the sub-applications in the application.

An interaction message processing method according to another embodiment of this application may be run on the backend server 104. The backend server 104 receives a to-be-processed interaction message; performs intention classification on the to-be-processed interaction message, to obtain an intention classification result of the to-be-processed interaction message; performs semantic analysis on the to-be-processed interaction message when the intention classification result includes a mini application program intention, to determine a message keyword of the to-be-processed interaction message; determines a program identifier of a target mini application program corresponding to the to-be-processed interaction message according to the message keyword; and transmits a message processing result based on the program identifier of the target mini application program. The message processing result is returned to the terminal 102, so that the terminal 102 may display a target interaction message based on the target mini application program in a target interaction interface according to the message processing result.

The terminal 102 may be a desktop device or a mobile terminal, such as a desktop computer, a tablet computer, or a smartphone. The backend server 104 may be an independent physical server, a physical server cluster, or a virtual server.

Figure 2:
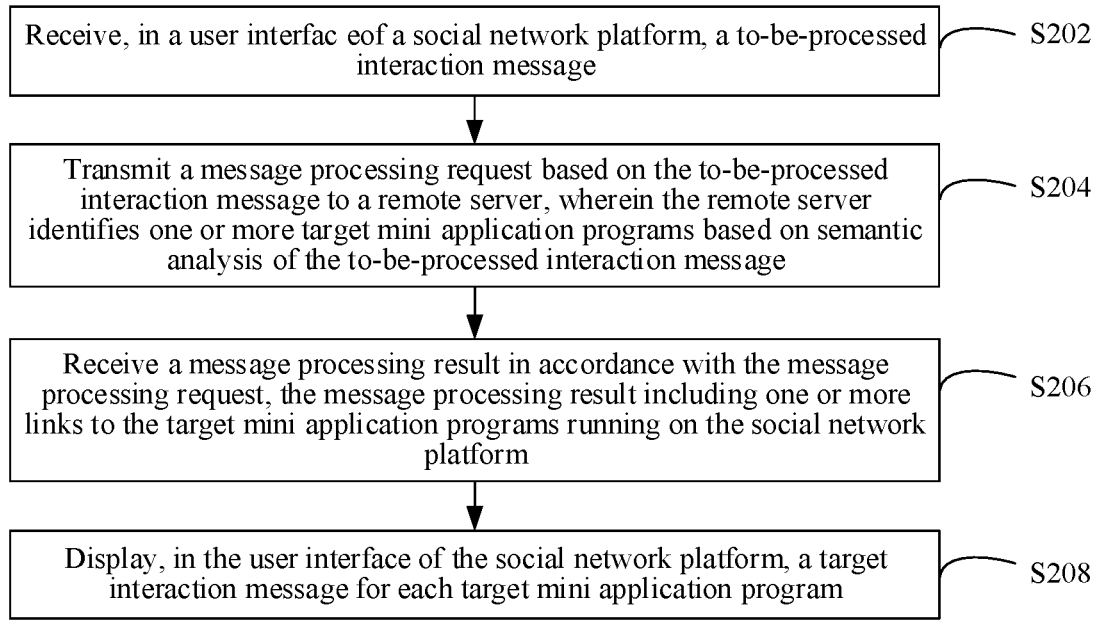
FIG. 2 is a schematic flowchart of an interaction message processing method according to some embodiments of this application.

As shown in FIG. 2, in an embodiment, an interaction message processing method is provided. The method may be run on the terminal 102 in FIG. 1. The interaction message processing method includes the following steps:

S202. Receive, in a user interface of a social network platform, a to-be-processed interaction message.

The terminal receives a to-be-processed interaction message when a message input trigger instruction is received in a user interface.

The user interface (e.g., a target interaction interface) is an interface provided on the terminal for a user, which is a human-computer interaction interface provided for the user. The target interaction interface may be an interface for displaying message exchanged between the user and a product. The product includes at least one product that corresponds to this embodiment, such as a mini application program providing a dialogue service, a public service platform providing a dialogue service, or an application providing a dialogue service. A manner of receiving the message input trigger instruction may be receiving a command inputted by the user in a text or speech form, or receiving an input command by clicking/tapping, touching and holding, selecting, or touching a message input control by the user in the target interaction interface. The message input control may be a control such as a message input box, a key, or a button.

Before receiving the message input trigger instruction in the target interaction interface, the terminal further needs to display the target interaction interface. Display of the target interaction interface may be triggered after a target interaction interface display instruction is received. The target interaction interface display instruction may be triggered in accordance with the selection of a product corresponding to the interaction message. The product includes at least one of an application, a public service platform, and a mini application program. The public service platform may be at least one of service platforms such as a public account, a subscription, and a service. Specifically, the target interaction interface display instruction may be triggered by opening an official account of the social network platform on the user interface, which provides an intelligent dialogue function. More specifically, the target interaction interface display instruction may be triggered by opening the official account of AI chatbot Qianxun on the social network application WeChat. In some embodiments, the user interface is user interface of a social networking application. The user interface displays interactions between a user of the terminal 102 and an official account of the social network platform. The user has a user account on the social network platform. In some embodiments, prior to the interactions, the user account subscribes to the official account on the social network platform.

The to-be-processed interaction message is a message inputted by the user. A manner of receiving the to-be-processed interaction message may be receiving a text message or a picture message inputted by the user through the message input control in the target interaction interface, or may be capturing a speech message inputted by the user through an audio capture device such as a microphone, or may be capturing a video message or a picture message inputted by the user through a video capture device such as a camera. In other words, the to-be-processed interaction message may be at least one of a text message, a speech message, a picture message, and a video message.

S204. Transmit a message processing request based on the to-be-processed interaction message to a remote server, wherein the remote server identifies one or more target mini application programs based on semantic analysis of the to-be-processed interaction message.

When a message transmission trigger instruction is received in the target interaction interface, the terminal displays the to-be-processed interaction message in the target interaction interface, and transmits a message processing request based on the to-be-processed interaction message.

The message transmission trigger instruction is used for triggering the terminal to transmit the received to-be-processed interaction message to a backend server. A manner in which the terminal receives the message transmission trigger instruction may be clicking/tapping or touching a transmit button, or may be clicking/tapping or touching a transmit confirmation button, or may be receiving the message transmission trigger instruction through speech or other command input manners.

The to-be-processed interaction message is displayed in the target interaction interface, so that the user can know the message that the user transmits in an intelligent dialogue process and it is convenient for the user to search for a recorded message.

The message processing request is used for requesting the backend server to process the to-be-processed interaction message, so as to give a reply to the to-be-processed interaction message in a complete dialogue process. The message processing request includes the to-be-processed interaction message and a user identifier. The user identifier is used for determining a terminal corresponding to the user when a message processing result is returned to the user. When the interaction message processing method is implemented by using a public service platform in an application, the user identifier may be a user identifier of the user in the application.

S206. Receive, from the remote server, a message processing result in accordance with the message processing request, the message processing result being determined based on a target mini application program (also referred to herein as a target mini program) corresponding to the to-be-processed interaction message, including one or more links to the target mini application programs running on the social network platform.

The terminal receives a message processing result returned based on the message processing request, the message processing result being determined based on a target mini program corresponding to the to-be-processed interaction message.

After receiving the message processing request, the backend server processes the to-be-processed interaction message, to obtain the message processing result based on the target mini application program corresponding to the to-be-processed interaction message, and feeds back the message processing result to the terminal. The target mini application program refers to a mini application program corresponding to the to-be-processed interaction message. The mini application program is a sub-application that can be used without being downloaded and installed. To provide more diversified services to the user, a developer may develop corresponding mini programs for applications (for example, an instant messaging application, a shopping application, and a mail application) of the terminal. The mini programs may be embedded in an application of the terminal as sub-applications, and corresponding services may be provided for the user by running the sub-applications (that is, corresponding mini programs) in the application.

The terminal receives the message processing result returned by the backend server based on the message processing request, the message processing result being determined by the backend server based on the target mini program corresponding to the to-be-processed interaction message.

The message processing result may include program information of the target mini program. The program information may include at least one of program link information and invoked interface information of the target mini program. The message processing result may further include page data of the target mini program. The page data may be homepage data of the target mini application program, or may be target page data corresponding to the to-be-processed interaction message in the target mini program.

S208. Display, in the user interface of the social network platform, a target interaction message for each target mini application program according to the message processing result.

The terminal displays a target interaction message based on the target mini program in the target interaction interface according to the message processing result.

The target interaction message based on the target mini program may include the message processing result, or may include a message obtained by performing further processing on the message processing result. For example, the program information of the target mini program may be displayed in the target interaction interface. Alternatively, an icon or a homepage of the target mini program may be displayed in the target interaction interface. The icon may jump to the homepage of the target mini program through a hyperlink. Alternatively, the invoked interface information of the target mini program may be displayed in the target interaction interface. The invoked interface information may be address information of a target page of a functional module corresponding to the to-be-processed interaction message in the target mini program. Alternatively, a target page of the target mini program may be displayed in the target interaction interface. Alternatively, an execution result after the target mini program is invoked may be displayed in the target interaction interface.

Based on the above, according to the exemplary embodiment provided in this application, a to-be-processed interaction message is received when a message input trigger instruction is received in a target interaction interface; the to-be-processed interaction message is displayed in the target interaction interface when a message transmission trigger instruction is received in the target interaction interface, and a message processing request is transmitted based on the to-be-processed interaction message; a message processing result returned based on the message processing request is received, the message processing result being determined based on a target mini program corresponding to the to-be-processed interaction message; and a target interaction message based on the target mini program is displayed in the target interaction interface according to the message processing result. The returned message processing result based on the target mini program may be received, and the target interaction message based on the target mini program may be displayed in the target interaction interface based on the message processing result, so that an interaction message processing function can be expanded and user stickiness can be increased. Besides, due to the limitation of mini program obtaining manners, according to the interaction message processing method, the quantity of uses of the mini program can be improved. In addition, a closed-loop of operations is easily formed based on the interaction message processing method in this embodiment, which helps to collect statistics on traffic revenue.

In another exemplary embodiment, the message processing result includes the program information of the target mini program. The displaying, by the terminal, a target interaction message based on the target mini program in the target interaction interface according to the message processing result includes: displaying, by the terminal, the target interaction message based on the target mini program in the target interaction interface according to the program information of the target mini program.

The program information may include at least one of program link information, a program name, a program identifier, and a program icon that are related to the program. Content of the target interaction message may be at least one of a program identifier, a program name, program link information, and a program icon of the target mini program. The terminal may transmit a program query request to the backend server by using the program identifier or the program name, to obtain the program link information of the target mini program, and transmit a target program request to the target mini program by using the program link information to request a service of the target mini program. The terminal may alternatively transmit a target program request to the target mini program by using at least one of the program identifier, the program name, the program link information, or the program icon to request a service of the target mini program.

Based on the above, according to the exemplary embodiment provided in this application, the target interaction message displayed in the target interaction interface by the terminal based on the program information of the target mini program may recommend the target mini program to the user, which makes it convenient for the user to request a service of the target mini program, and expands the interaction message processing function, thereby increasing user stickiness.

In another exemplary embodiment, the program information includes the program link information of the target mini program. The program link information may include at least one of a program link address and a port number. The displaying, by the terminal, the target interaction message based on the target mini program in the target interaction interface according to the program information of the target mini program includes: displaying, by the terminal, the target interaction message based on the target mini program in the target interaction interface according to the program link information of the target mini program.

A manner in which the terminal displays the target interaction message based on the target mini program in the target interaction interface according to the program link information of the target mini program may be that the terminal displays the program link information of the target mini program in the target interaction interface. The user may be linked to the target mini program by clicking/tapping the program link information in the target interaction interface displayed on the terminal. In other words, by clicking/tapping the program link information, the terminal is enabled to transmit a target program request to the target mini program to request a service of the target mini program.

The manner in which the terminal displays the target interaction message based on the target mini program in the target interaction interface according to the program link information of the target mini program may alternatively be that the terminal displays other program information of the target mini program in the target interaction interface, and sets a hyperlink of the other program information to the program link information of the target mini program. The user may be linked to the target mini program by clicking/tapping the other program information in the target interaction interface displayed on the terminal. In other words, a target service request may be transmitted to the target mini program by clicking/tapping the other program information to request a service of the target mini program.

Based on the above, according to the exemplary embodiment provided in this application, there is no need to first request the program link information by using the other program information and then request a service of the target mini program by using the program link information. Therefore, the service of the target mini program can be requested quickly, which can further increase user stickiness of interaction message processing.

In another exemplary embodiment, the program information includes the invoked interface information of the target mini program, and the invoked interface information may be at least one of an invoked interface name and an invoked interface identifier. The invoked interface information corresponds to the to-be-processed interaction message. The displaying, by the terminal, the target interaction message based on the target mini program in the target interaction interface according to the program information of the target mini program includes: displaying, by the terminal, the target interaction message based on the target mini program in the target interaction interface according to the invoked interface information of the target mini program.

A manner in which the terminal displays the target interaction message based on the target mini program in the target interaction interface according to the invoked interface information of the target mini program may be that the terminal displays the invoked interface information of the target mini program in the target interaction interface. The user may be linked to a specific functional module corresponding to the to-be-processed interaction message in the target mini program by clicking/tapping the invoked interface information in the target interaction interface displayed on the terminal. In other words, by clicking/tapping the invoked interface information, the terminal is enabled to transmit a service request to the target mini program to request a specific service of the functional module in the target mini program.

A manner in which the terminal displays the target interaction message based on the target mini program in the target interaction interface according to the invoked interface information of the target mini program may be that the terminal displays the program information of the target mini program in the target interaction interface, and sets a hyperlink of the program information to the invoked interface information of the target mini program. The user may be linked to a specific functional module corresponding to the to-be-processed interaction message in the target mini program by clicking/tapping the program information in the target interaction interface displayed on the terminal. In other words, by clicking/tapping the program information, the terminal is enabled to transmit a service request to the target mini program to request a specific service of the functional module in the target mini program.

Based on the above, according to the exemplary embodiment provided in this application, the user may be linked to the specific functional module corresponding to the to-be-processed interaction message in the target mini program based on the invoked interface information, thereby reducing operation steps of the user and further increasing user stickiness.

In another exemplary embodiment, the message processing result further includes the page data of the target mini program. The displaying, by the terminal, the target interaction message based on the target mini program in the target interaction interface according to the program information of the target mini program includes: determining, by the terminal, the target interaction message based on the target mini program according to the program information and the page data of the target mini program; and displaying the target interaction message in the target interaction interface.

The page data refers to page data of a service provided by the target mini program. For example, the page data may be homepage data, or may be target page data. The homepage refers to an interface that is first displayed when the target mini program provides a service according to a general procedure. The target page refers to a page of a functional module corresponding to the to-be-processed interaction message in the target mini program.

In this embodiment, the content of the target interaction message includes the page data and the program information. A manner in which the terminal displays the target interaction message in the target interaction interface may be that the terminal displays the page data and the program information in the target interaction interface. The manner in which the terminal displays the target interaction message in the target interaction interface may alternatively be that the terminal displays the page data in the target interaction interface, and sets a hyperlink of the page data to the program link information of the target mini program.

Based on the above, according to the exemplary embodiment provided in this application, the page of the target mini program is displayed in the target interaction interface of the terminal, so that related information of the target mini program can be displayed more intuitively, and the user can more clearly and intuitively know a service that the target mini program can provide.

In another exemplary embodiment, the page data includes homepage data of the target mini program; and the displaying, by the terminal, the target interaction message in the target interaction interface includes: rendering, by the terminal, the homepage data, displaying a homepage of the target mini program in the target interaction interface, and setting a hyperlink of the homepage according to program link information of the target mini program.

In this embodiment, the content of the target interaction message includes the homepage data of the target mini program. The terminal renders the homepage data, displays the homepage of the target mini program in the target interaction interface, and sets the hyperlink of the homepage to the program link information of the target mini program. In this way, the user may jump to the homepage of the target mini program by clicking/tapping the program link information, so that the terminal provides a service of the target mini program for the user. Therefore, not only the target mini program is recommended to the user and the user can know the service of the target mini program clearly and intuitively, but also the terminal can provide the service of the target mini program for the user conveniently and quickly, thereby simplifying user operations and increasing user stickiness.

It may be understood that, in some other embodiments, the program link information of the mini program may not be provided for jumping. In other words, the hyperlink to the target mini program is not set, and the user may autonomously find an access manner of the target mini program based on the target interaction message.

In another application scenario, a company colleague says to an AI chatbot (e.g., an official account, an official platform, a public account, etc.) "Please order 10 takeouts for me at noon, and make out a company invoice.". A conventional manner may be that on the premise of knowing "Meituan Takeout", the AI chatbot may think of using a mini application program in WeChat, and then the AI Chatbot opens WeChat, inputs and searches for a mini program "Meituan Takeout", and then orders takeouts. During filling in the company invoice, the AI chatbot may not remember a long company ticket number. In this example, the AI chatbot exits the mini application program "Meituan Takeout", and searches for and opens a mini application program "Tax invoice assistant" on the premise of knowing "Tax invoice assistant". After obtaining a tax number, the AI chatbot opens the mini application program "Meituan Takeout" again.

Figure 3:
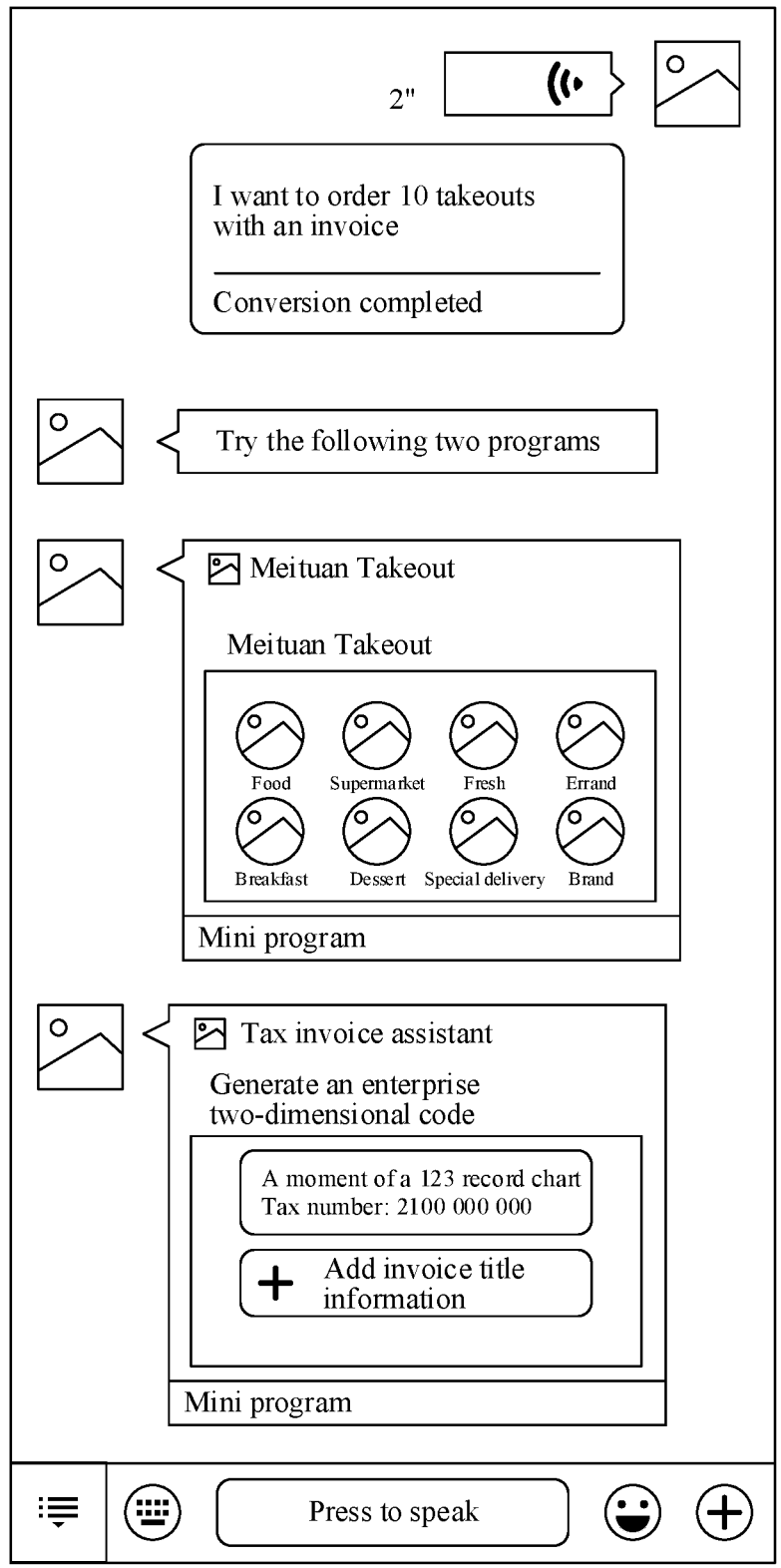
FIG. 3 is a schematic diagram of an interaction message processing method according to some embodiments of this application.

The foregoing application scenario may be shown in FIG. 3 after adopting the method in this embodiment, and a product corresponding to this method may be a target service platform in WeChat (social software). The AI chatbot only needs to know the target service platform and tell the target service platform "I want to order 10 takeouts with an invoice" instead of knowing the specific mini programs such as "Meituan Takeout" and "Tax invoice assistant". After obtaining the to-be-processed interaction message, the terminal forwards the to-be-processed interaction message to a backend server of the target service platform. After receiving the to-be-processed interaction message, the backend server of the target service platform performs corresponding processing on the to-be-processed interaction message, and finally returns a message processing result. The message processing result includes a script "try the following two programs", and program names and homepage data of two target mini programs "Meituan Takeout" and "Tax invoice assistant". When the terminal displays a target interaction message, the terminal displays the script and the program names and the homepage data of the two target mini programs. The user may click/tap the target interaction message, so that the terminal jumps to a corresponding target mini program.

In another exemplary embodiment, the page data includes target page data of the target mini program. The target page data corresponds to the invoked interface information of the target mini program, and the invoked interface information corresponds to the to-be-processed interaction message. The displaying, by the terminal, the target interaction message in the target interaction interface includes: rendering, by the terminal, the target page data, displaying a target page of the target mini program in the target interaction interface, and setting a hyperlink of the target page according to the invoked interface information of the target mini program.

Figure 4:
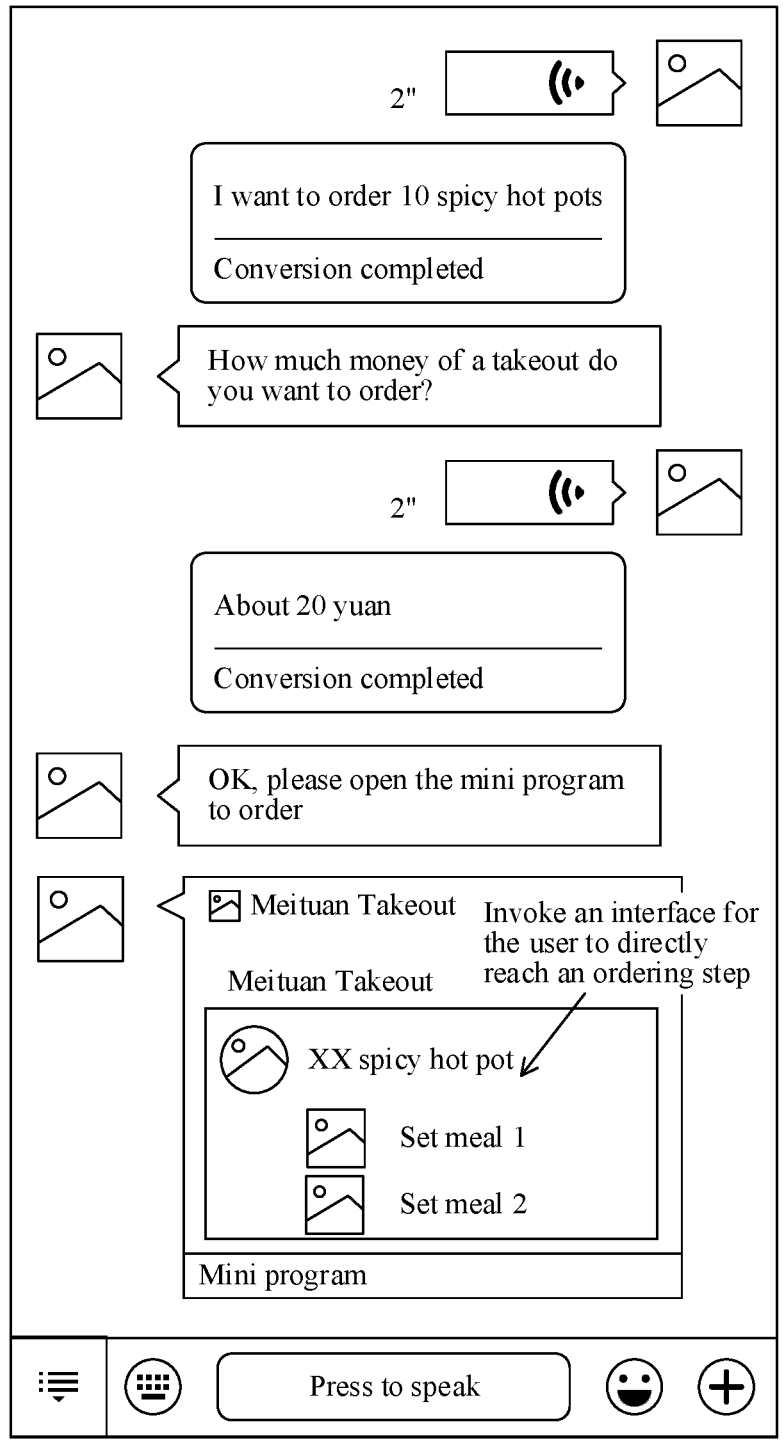
FIG. 4 is a schematic diagram of an interaction message processing method according to some embodiments of this application.

In this embodiment, the content of the target interaction message includes the target page data of the target mini program. The terminal renders the target page data, displays the target page of the target mini program in the target interaction interface, and sets the hyperlink of the target page to the invoked interface information of the target mini program. The target page refers to a page of a functional module providing a service corresponding to the to-be-processed interaction message in the target mini program. The user may click/tap the target page to control the terminal to jump to the target page of the target mini program, to provide the service of the target mini program for the user. In another exemplary embodiment, as shown in FIG. 4, the target interaction message displayed on the terminal may include a script "OK, please open the mini program to order", a program name of a target mini program "Meituan Takeout" determined by the backend server, and a target page corresponding to invoked interface information of an ordering function module of the target mini program.

Based on the above, according to the exemplary embodiment provided in this application, not only the user can know the service of the target mini program clearly and intuitively, but also the terminal can provide the service of the target mini program for the user conveniently and quickly, thereby increasing user stickiness.

In another exemplary embodiment, after the rendering, by the terminal, the target page data, displaying a target page of the target mini program in the target interaction interface, and setting a hyperlink of the target page according to the invoked interface information of the target mini program, the method further includes: receiving, by the terminal, a service request transmission instruction based on the target page, the service request transmission instruction including the program information and a preset parameter of the target mini program; transmitting, by the terminal, a target service request according to the program information and the preset parameter; receiving, by the terminal, a service response result returned based on the target service request; and displaying, by the terminal, the service response result returned based on the target service request.

In this embodiment, the target interaction message includes the invoked interface information of the target mini program, and the invoked interface information corresponds to the to-be-processed interaction message. A manner in which the terminal receives the service request transmission instruction based on the target interaction message may be: receiving the service request transmission instruction by clicking/tapping, double-clicking/tapping, or touching and holding the target interaction message, or receiving the service request transmission instruction by clicking/tapping, double-clicking/tapping, or touching and holding a preset button or another control in the target interaction message.

The target service request is used for requesting the service of the target mini program. The program information may be the program link information. The preset parameter may be a related parameter that needs to be provided when the terminal requests the target mini program. The preset parameter may be received before the terminal receives the service request transmission instruction. The preset parameter may alternatively be extracted from the message processing result before the terminal receives the service request transmission instruction, and the preset parameter corresponds to the to-be-processed interaction message. For example, when the target mini program is a ticketing assistant, the preset parameter may be company information that is inputted by the user and for which an invoice needs to be made out, or may be company information that is extracted by the backend server from the to-be-processed interaction message and for which an invoice needs to be made out. In another example, when the target mini program is a takeout mini program such as Meituan Takeout, the preset parameter may be related information such as a product, a quantity, or a merchant of takeouts that is inputted by the user, or may be related information such as a product, a quantity, or a merchant of takeouts that is extracted by the backend server from the to-be-processed interaction message. The target service request includes the program information and the preset parameter. The terminal transmits the target service request to a server of the target mini program according to the program information. The server of the target mini program performs a target service according to the target service request and returns a service response result to the terminal. The terminal receives the service response result returned based on the target service request; and the terminal displays the service response result returned based on the target service request.

Based on the above, according to the exemplary embodiment provided in this application, when invoking the target mini application program, the user does not need to know a specific operation method of the target mini application program. After the target page of the functional module corresponding to the to-be-processed interaction message in the target mini program is displayed, a service transmission request may be received based on the target page, then a target service request is transmitted to the server of the target mini program based on the service transmission request, and a service response result is finally received and displayed. In this way, operation steps of the user can be reduced, and the service of the target mini program can be provided for the user more conveniently and quickly, thereby further increasing user stickiness.

In another exemplary embodiment, the displaying, by the terminal, the target interaction message in the target interaction interface includes: displaying, by the terminal, the page data on a subpage embedded in the target interaction interface, and setting a hyperlink of the page data according to the program information of the target mini application program.

Based on the above, according to the exemplary embodiment provided in this application, the content of the target interaction message further includes the page data. The page data is displayed on the subpage embedded in the target interaction interface. In this way, the page data is displayed in a different manner than a common interaction message, so that the user can quickly distinguish between the common interaction message and the target interaction message based on the target mini program, thereby further increasing user stickiness. The terminal sets the hyperlink of the page data according to the program information of the target mini program. In this way, the user can be linked to the target mini program conveniently and quickly, thereby further increasing user stickiness.

In another exemplary embodiment, after the displaying, by the terminal, a target interaction message based on the target mini application program in the target interaction interface according to the message processing result, the method further includes: receiving, by the terminal, a program request transmission instruction based on the target interaction message; transmitting, by the terminal, a target program request according to the program information of the target mini application program carried in the program request transmission instruction; receiving, by the terminal, program response information returned according to the target program request; and displaying, by the terminal, the program response information returned according to the target program request.

In this embodiment, the program information included in the message processing result may include the program link information of the target mini program. A manner in which the terminal receives the program request transmission instruction based on the target interaction message may be: receiving the program request transmission instruction by clicking/tapping, double-clicking/tapping, or touching and holding the target interaction message. The program request transmission instruction carries the program link information of the target mini application program. The terminal transmits a target program request according to the program link information, the target program request carrying the program link information and a terminal identifier. The terminal transmits the target program request to the server of the target mini application program based on the program link information. Based on the terminal identifier, the backend server may return program response information determined based on the target program request to the terminal. In this case, the program response information may include homepage data of the target mini application program.

In this embodiment, the program information included in the message processing result may alternatively include the invoked interface information of the target mini program, and the invoked interface information corresponds to the to-be-processed interaction message. A manner in which the terminal receives the program request transmission instruction based on the target interaction message may be: receiving the program request transmission instruction by clicking/tapping, double-clicking/tapping, or touching and holding the target interaction message. The program request transmission instruction carries the invoked interface information of the target mini application program. The terminal transmits a target program request according to the invoked interface information, the target program request carrying the invoked interface information and a terminal identifier. The terminal transmits the target program request to the server of the target mini program based on the invoked interface information. Based on the terminal identifier, the backend server may return program response information determined based on the target program request to the terminal. In this case, the program response information may include target page data of the target mini program.

Based on the above, according to the exemplary embodiment provided in this application, after the target mini program is recommended to the user, a program request transmission instruction may be received, a target program request may be transmitted, and program response information may be received and displayed, so that the user can request a related service of the target mini program based on the program response information. In this way, a method for accessing the target mini program is provided for the user, and usage of the target mini program can be improved.

In another exemplary embodiment, the program response information includes the target page data. In other words, the invoked interface information is further carried in the target program request. By obtaining invoked interface information of a functional module clicked/tapped in the target interaction message, the terminal may obtain the invoked interface information when receiving the program request transmission instruction. After the transmitting, by the terminal, a target program request, and receiving and displaying program response information returned based on the target program request, the method further includes: receiving, by the terminal, a service request transmission instruction based on the program response information, the service request transmission instruction including the invoked interface information and the preset parameter of the target mini program; transmitting, by the terminal, a target service request according to the preset parameter and the invoked interface information; receiving, by the terminal, a service response result returned according to the target service request; and displaying, by the terminal, the service response result returned according to the target service request.

A manner in which the terminal receives the service request transmission instruction based on the program response information may be that the terminal receives the service request transmission instruction inputted by clicking/tapping a preset button by the user in the target page. The preset button may be a button similar to "Submit", "OK", or the like. The service request transmission instruction includes the invoked interface information and the preset parameter of the target mini program. The terminal requests a corresponding functional module service of the target mini application program based on the invoked interface information. The preset parameter is a parameter required for the functional module service. The preset parameter corresponds to the to-be-processed interaction message. The preset parameter may be determined by the backend server according to the to-be-processed interaction message and returned to the terminal through the message processing result.

The target service request carries the invoked interface information and the preset parameter. The target service request is used for requesting a service provided by a functional module required by the user in the target mini application program, that is, the functional module service. The target service request further carries a terminal identifier. In this way, the server of the target mini program may return, according to the terminal identifier, a service response result to the terminal transmitting the target service request. The terminal receives the service response result returned according to the target service request; and the terminal displays the service response result returned according to the target service request. The service response result is an execution result returned by the backend server according to the target service request.

Based on the above, according to the exemplary embodiment provided in this application, program information of a target mini program is first provided for a user, and a program request transmission instruction is received based on the program information; then a target program request is transmitted, and target page data is received and displayed; and a service request transmission instruction is received based on a target page, a target service request is transmitted, and a service response result is received and displayed. In this way, a service function of the target mini program can be expanded while proving a dialogue function for the user. Therefore, user stickiness can be increased.

In another exemplary embodiment, the receiving, by the terminal, a service request transmission instruction based on the program response information includes: receiving, by the terminal, a parameter modification instruction based on the program response information; and receiving, by the terminal, the service request transmission instruction based on the program response information after modifying the preset parameter according to the parameter modification instruction, the service request transmission instruction including the invoked interface information and the modified preset parameter of the target mini program.

In this embodiment, after the preset parameter is determined, the preset parameter may be modified. In this way, after the user transmits the to-be-processed interaction message, if the related parameter required by the user changes, or the preset parameter in the message processing result is different from that the user actually intends to express, the preset parameter may be modified. Therefore, the target service request can better meet an actual requirement of the user, thereby further increasing user stickiness.

Figure 5:
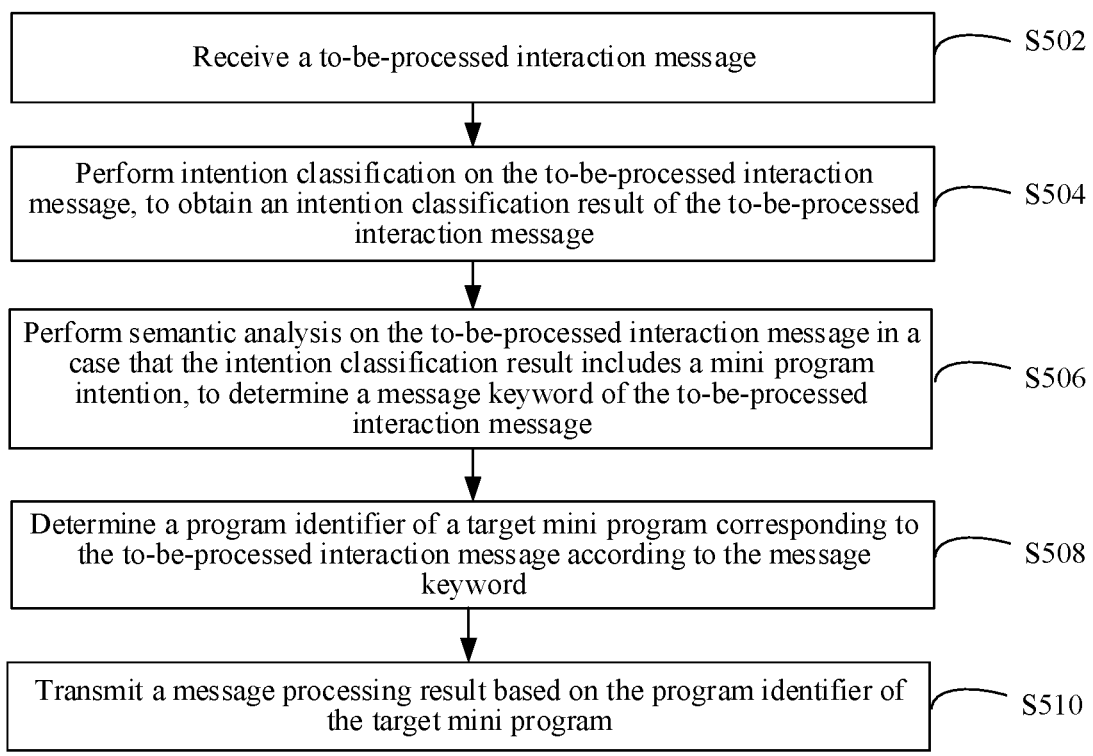
FIG. 5 is a schematic flowchart of an interaction message processing method according to some embodiments of this application.

As shown in FIG. 5, this application further provides an interaction message processing method run in a backend server, and the method may be run in the backend server 104 in FIG. 1. The method includes the following steps:

S502: Receive a to-be-processed interaction message.

The to-be-processed interaction message may be received by a terminal and forwarded to the backend server. Specifically, the to-be-processed interaction message may be forwarded by the terminal by running a target service platform in an application.

The backend server receives the to-be-processed interaction message. The to-be-processed interaction message may be a message in a text form, or may be a message in a speech form, or may be a message in a video, picture, or expression form.

After obtaining a to-be-processed interaction message inputted by a user, the terminal may forward the to-be-processed interaction message to the backend server for processing. In this way, efficiency of the target service platform in responding to customers can be improved, thereby increasing user stickiness.

After obtaining the to-be-processed interaction message inputted by the user, the terminal may alternatively forward the to-be-processed interaction message to the backend server according to a preset policy. Accordingly, the backend server receives the to-be-processed interaction message according to a corresponding policy. The preset policy may be forwarding the to-be-processed interaction message at a preset time interval, or forwarding a preset quantity of received to-be-processed interaction messages at a time, the preset quantity being at least one.

S504. Perform intention classification on the to-be-processed interaction message, to obtain an intention classification result of the to-be-processed interaction message.

The backend server performs intention classification on the to-be-processed interaction message, to obtain an intention classification result of the to-be-processed interaction message.

The backend server may first perform semantic understanding on the to-be-processed interaction message, to obtain semantic information of the to-be-processed interaction message, and then perform intention classification on the semantic information to obtain the intention classification result. The intention classification refers to classifying an internal intention expressed by the semantic information in the to-be-processed interaction message, and an intention category of the internal intention may include at least one intention category of a chat intention, a character intention, a music intention, and a sub-application intention (mini program intention). In this embodiment, the quantity of intention categories is at least 2, which may be tens or even dozens. The intention categories in this embodiment include at least the chat intention and the sub-application intention. Each intention category may be represented through a domain.

For example, in an AI speech interaction procedure, a natural language message of the user may be scored through a preset mapping process after speech recognition and semantic understanding are performed on the natural language message, which falls within an optimal domain range. A to-be-outputted returned result is obtained within the domain range. Different domains represent different AI capabilities.

One to-be-processed interaction message is finally matched with one intention category, and an intention classification result is determined based on the matched intention category.

S506. Perform semantic analysis on the to-be-processed interaction message when the intention classification result includes a mini program intention, to determine a message keyword of the to-be-processed interaction message.

The backend server performs semantic analysis on the to-be-processed interaction message when the intention classification result includes a mini program intention, to determine a message keyword of the to-be-processed interaction message.

The backend server performs semantic analysis on the to-be-processed interaction message, to obtain the message keyword of the to-be-processed interaction message. The semantic analysis may be implemented by using an independent semantic analysis algorithm, or may be implemented by using a neural network model. The semantic analysis may be implemented by using a neuro-linguistic programming (NLP) technology, to obtain the message keyword. The message keyword is a word representing important information of the to-be-processed interaction message in the to-be-processed interaction message. For example, when the to-be-processed interaction message is "I want to order a takeout", message keywords obtained through semantic analysis may include: order a takeout.

S508. Determine a program identifier of a target mini program corresponding to the to-be-processed interaction message according to the message keyword.

The backend server may determine a target mini program corresponding to the to-be-processed interaction message according to the message keyword after obtaining the message keyword. A program identifier of the target mini program corresponding to the to-be-processed interaction message may be obtained once the message keyword is obtained. For example, when message keywords are order a takeout, a target mini program may be determined to be a mini program for ordering a takeout. Further, program features, such as a quantity of uses, a quantity of uses within a recent preset time, user reviews, and the like of a takeout-ordering mini program may be further considered to determine which takeout program is finally determined as the target mini program.

Exemplarily, the backend server may determine the program identifier of the target mini program corresponding to the to-be-processed interaction message according to the message keyword when the intention classification result includes the mini program intention. In this way, the backend server may not need to determine the program identifier of the target mini program corresponding to the to-be-processed interaction message according to the message keyword when the intention classification result does not include the mini program intention.

The backend server performs semantic analysis on the to-be-processed interaction message, to determine the message keyword of the to-be-processed interaction message, and determines the program identifier of the target mini program corresponding to the to-be-processed interaction message according to the message keyword. The backend server may perform intention classification on the to-be-processed interaction message by using a neural network model, to obtain the intention classification result of the to-be-processed interaction message. For example, the intention classification may be implemented by using a fully connected neural network. A quantity and a depth of hidden layers of the fully connected neural network may be adjusted according to labeled data. An output of the fully connected neural network may use a sigmoid function as activation so that an output value ranges from 0 to 1. The labeled data may be represented by using a vector of 0 and 1.0 indicates that the data has no label at this position, and 1 indicates that the data has a label at this position. Digits of the vector are equal to a quantity of to-be-classified mini programs. That is, an identifier of a mini program corresponding to 1 in the vector is the program identifier of the target mini program.

S510. Transmit a message processing result based on the program identifier of the target mini program.

The backend server transmits a message processing result based on the program identifier of the target mini program. Therefore, the transmitted message processing result is a message processing result based on the target mini program. The message processing result may be the program identifier of the target mini program, or may be program information of the target mini program found based on the program identifier, or may be an execution result of the target mini program obtained after the backend server invokes and executes the target mini program based on the program identifier.

The program information may include at least one of program link information of the target mini program, a program name, a program identifier, and a program icon that are related to the program, and may further include invoked interface information of the target mini program.

In this way, the terminal may display a target interaction message based on the target mini program in a target interaction interface according to the message processing result returned by the backend server.

According to the interaction message processing method, a backend server receives a to-be-processed interaction message; the backend server performs intention classification on the to-be-processed interaction message, to obtain an intention classification result of the to-be-processed interaction message; the backend server performs semantic analysis on the to-be-processed interaction message, to determine a message keyword of the to-be-processed interaction message; the backend server determines a program identifier of a target mini program corresponding to the to-be-processed interaction message according to the message keyword; and the backend server transmits a message processing result based on the program identifier of the target mini program. The message processing result based on the target mini program may be fed back, so that an interaction message processing function can be expanded and user stickiness can be increased. Besides, due to the limitation of mini program obtaining manners, according to the interaction message processing method, the quantity of uses of the target mini program can be improved. In addition, a closed-loop of operations is easily formed based on the interaction message processing method in this embodiment, which helps to collect statistics on traffic revenue.

Figure 6:
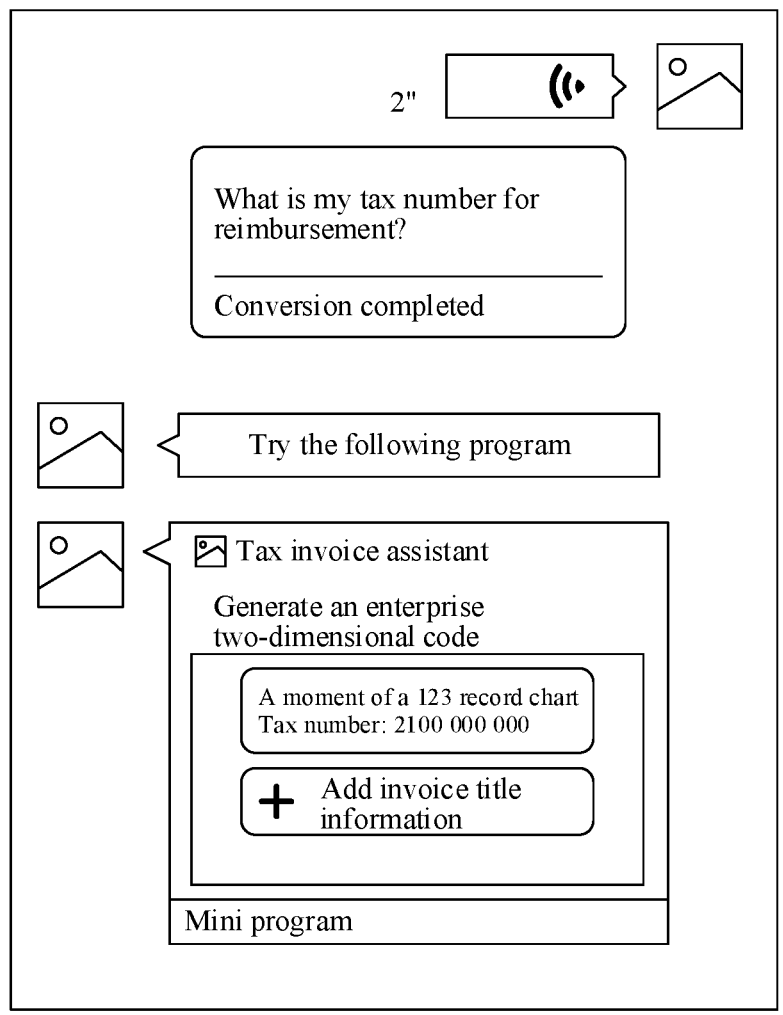
FIG. 6 is a schematic diagram of an interaction message processing method according to some embodiments of this application.

In another application scenario, as shown in FIG. 6, the user actively asks a target service platform, such as an official account AI chatbot Qianxun, "What is my tax number for reimbursement?" After receiving the to-be-processed interaction message, a backend server of the target service platform performs intention classification on the to-be-processed interaction message. An obtained intention classification result includes the mini program intention. After obtaining a message keyword by performing semantic analysis on the to-be-processed interaction message, a program identifier of a mini program "Tax invoice assistant" may be determined as the program identifier of the target mini program according to the message keyword. A message processing result transmitted by the backend server to the terminal may be program information of "Tax invoice assistant". As shown in FIG. 6, a result displayed on the terminal is a link page of the target mini program. The user may enter the target mini program by clicking/tapping the link page.

Figure 7:
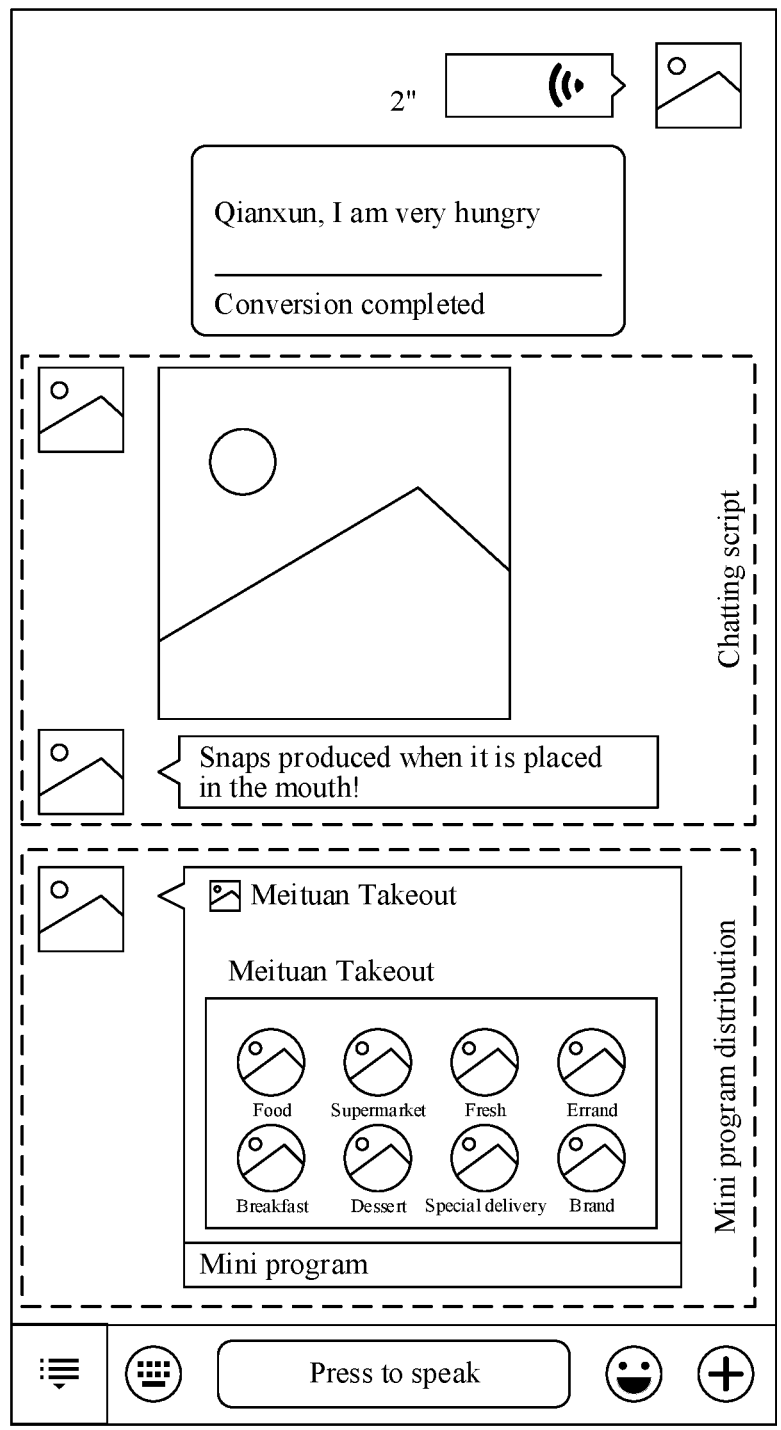
FIG. 7 is a schematic diagram of an interaction message processing method according to some embodiments of this application.

In another application scenario, as shown in FIG. 7, the user says "Qianxun, I am very hungry" in a chatting process on the target service platform. After the backend server of the target service platform receives the to-be-processed interaction message, the backend server may extract a keyword "hungry" through semantic analysis. A message processing result returned to the terminal may include program information of a mini program "Meituan Takeout" recommended and distributed to the user in addition to a chatting script.

In another exemplary embodiment, the performing, by the backend server, intention classification on the to-be-processed interaction message, to obtain an intention classification result of the to-be-processed interaction message includes: extracting, by the backend server, a message feature of the to-be-processed interaction message; and performing, by the backend server, preset intention classification mapping on the message feature by using a neural network model, to obtain the intention classification result of the to-be-processed interaction message.

In this embodiment, after receiving the to-be-processed interaction message, the backend server first extracts a message feature of the to-be-processed interaction message. The message feature may include at least one feature vector of a message keyword vector and a message semantic vector. The backend server performs preset intention classification mapping on the message feature by using a neural network model, to obtain the intention classification result of the to-be-processed interaction message. In this way, the backend server obtains the intention classification result of the to-be-processed interaction message by performing mapping by using a neural network model. In this way, the accuracy of the intention classification result can be improved and user stickiness can be increased.

To further improve the accuracy of the intention classification result, in another exemplary embodiment, the neural network model is a fully connected neural network model. The performing, by the backend server, preset intention classification mapping on the message feature by using a neural network model, to obtain the intention classification result of the to-be-processed interaction message includes: performing, by the backend server, convolution mapping on the message feature by using a convolutional layer of the fully connected neural network model to obtain a convolution result; performing, by the backend server, pooling mapping on the convolution result by using a pooling layer of the fully connected neural network model to obtain a pooling result; and performing, by the backend server, fully connected mapping on the pooling result by using a fully connected layer of the fully connected neural network model, to obtain the intention classification result of the to-be-processed interaction message.

In this embodiment, the backend server performs preset intention classification mapping on the extracted message feature by using the fully connected neural network model. In the preset intention classification mapping process, the backend server performs convolution mapping by using a convolutional layer to obtain a convolution result, performs pooling mapping by using a pooling layer to obtain a pooling result, and performs fully connected mapping by using a fully connected layer to obtain the intention classification result. In this way, the accuracy of the intention classification result can be further improved and user stickiness can be further increased.

In another exemplary embodiment, the extracting, by the backend server, a message feature of the to-be-processed interaction message includes: performing, by the backend server, speech recognition on the to-be-processed interaction message, to obtain a text message; and extracting a message feature of the text message.

Speech recognition may convert a speech message into a text message. Speech recognition may be implemented by using an automatic speech recognition (ASR) technology. In this embodiment, the to-be-processed interaction message is a speech message, and the backend server performs speech recognition on the speech message to obtain a text message, and then extracts a message feature of the text message to obtain the message feature of the to-be-processed interaction message. In this way, the input efficiency of message input can be improved and more effective information can be received, to recommend a mini program better meeting a user requirement, thereby further increasing user stickiness.

Figure 8:
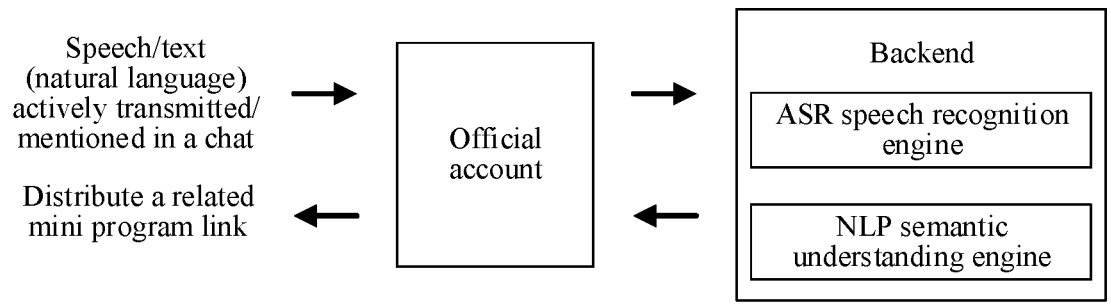
FIG. 8 is a diagram of implementation logic of an interaction message processing method according to some embodiments of this application.

In another exemplary embodiment, a product of this method is a target service platform. A diagram of implementation logic of the target service platform may be shown in FIG. 8. A backend server obtains, through a terminal, a to-be-processed interaction message actively transmitted or mentioned in a chat by the user. The to-be-processed interaction message may be in a text form, or may be in a speech form. The terminal forwards the to-be-processed interaction message to the backend server of the target service platform (an official account). The backend server of the target service platform may perform speech recognition on the to-be-processed interaction message by using an ASR speech recognition engine, to convert a speech message into a text message. Then, the backend server may perform semantic analysis on the text message by using an NLP semantic understanding engine to extract a message feature such as a message keyword of the text message, perform preset intention classification mapping on the message feature by using a neural network model to obtain an intention classification result of the to-be-processed interaction message, and determine a program identifier of a target mini program corresponding to the to-be-processed interaction message according to the message keyword. The backend server obtains program information of the target mini program according to the program identifier of the target mini program and then transmits the program information to the terminal. The program information includes program link information of the target mini program. The program link information of the target mini program is distributed through the terminal.

Figure 9:
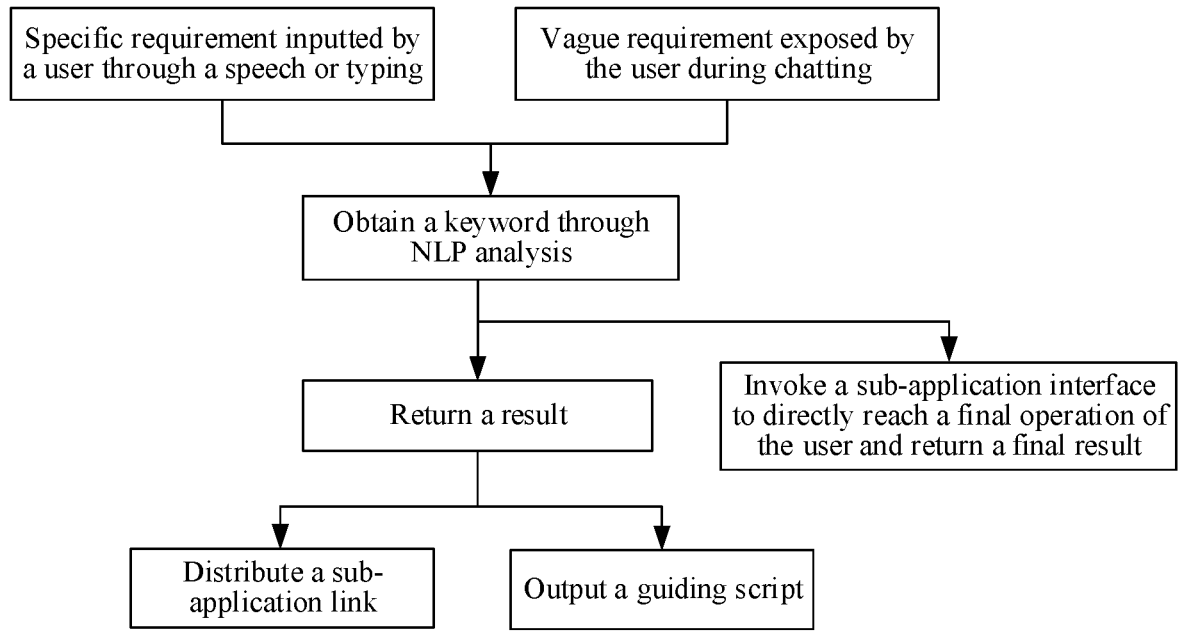
FIG. 9 is a flowchart of an interaction message processing method at a product level according to some embodiments of this application.

Based on the above, according to the exemplary embodiment provided in this application, a function of distributing or invoking mini programs by using the target service platform can be implemented. A logical flowchart at a product level of the target service platform may be shown in FIG. 9. On one hand, a user may actively input a specific requirement such as "I want to order a takeout" through a speech or typing. On the other hand, a related vague requirement may be exposed in a chatting process of the user. For example, the user mentions "I am hungry" during chatting. Intention classification is performed on the active "I want to order a takeout" and the passively exposed "I am hungry", both of which fall in a mini program intention. After determining a target mini program, a guiding script may be outputted to distribute program link information of the target mini program, or a final operation of the user may be directly reached by invoking invoked interface information of the target mini program, to return a final result.

In another exemplary embodiment, the transmitting, by the backend server, a message processing result based on the program identifier of the target mini program includes: obtaining, by the backend server, program information of the target mini application program according to the program identifier, the program information including program link information or invoked interface information of the target mini application program; and transmitting, by the backend server, the message processing result based on the program information.

The backend server may search a local database for the program information of the target mini program according to the program identifier. The backend server may alternatively transmit a search request to a server of the target mini program according to the program identifier, to request the program information of the target mini application program corresponding to the program identifier, so as to obtain the program information of the target mini program.

The program link information may include at least one of a link address and a port number of the target mini program. The invoked interface information may include at least one of a link address and a port number of a functional module of the target mini program. The message processing result transmitted by the backend server based on the program information may be the program link information of the target mini program, or may be the invoked interface information of the target mini application program, or may be page data corresponding to the program link information or the invoked interface information.

In this way, the program link information or the invoked interface information is included in the message processing result fed back by the backend server to the terminal, so that the user can access the target mini program conveniently and quickly through the program link information or the invoked interface information, and the quantity of uses of the target mini program can be improved.

In another exemplary embodiment, the transmitting, by the backend server, the message processing result based on the program information includes: requesting, by the backend server, page data of the target mini program according to the program information; and transmitting, by the backend server, the message processing result based on the page data and the program information after receiving the page data.

In this embodiment, the backend server transmits a page request to the server of the target mini program according to the program information, to request the page data of the target mini program. After receiving the page request, the server of the target mini program returns the page data to the backend server according to the page request. The backend server transmits the message processing result to the terminal based on the page data and the program information after receiving the page data. The page data and the program information are included in the message processing result fed back by the backend server to the terminal. In this way, the terminal may display the page data, so that the user can know the service provided by the target mini program more intuitively.

In another exemplary embodiment, the determining, by the backend server, a program identifier of a target mini program corresponding to the to-be-processed interaction message according to the message keyword includes: determining, by the backend server, candidate mini programs corresponding to the to-be-processed interaction message according to the message keyword; extracting, by the backend server, mini program features of the candidate mini programs; sorting, by the backend server, the candidate mini programs according to the mini program features, and determining a program identifier of a candidate mini program arranged at a preset position as the program identifier of the target mini program.

In this embodiment, the backend server may determine at least one candidate mini program according to the message keyword. For example, mini programs corresponding to weather may be China Weather and Moji Weather. In this embodiment, a target mini program having the highest correlation with the to-be-processed interaction message is determined by sorting the candidate mini programs. The backend server may combine the mini program features of the candidate mini programs by using a linear regression model, to optimize quantities of times that the mini programs are opened, to obtain a sorting result of the mini programs. A program identifier of a candidate mini program arranged at a preset position may be determined as the program identifier of the target mini program. The preset position may be any position, for example, the first position.

The mini program feature may include a text feature and a non-text feature. The text feature may be at least one of a keyword, a word frequency count, and a message matching degree. The non-text feature may be at least one of a quality score, a quantity of followers, and a quantity of times that a mini program is opened.

Based on the above, according to the exemplary embodiment provided in this application, the target mini program corresponding to the to-be-processed interaction message is determined by sorting the program identifiers of the candidate mini programs. In this way, the backend server can determine a mini program that better meets the user requirement to improve user satisfaction, thereby further improving user stickiness.

In another exemplary embodiment, the extracting, by the backend server, mini program features of the candidate mini programs includes: extracting, by the backend server, text features of the candidate mini programs and non-text features of the candidate mini programs when the candidate mini programs are text-type mini programs; or extracting, by the backend server, non-text features of the candidate mini programs when the candidate mini programs are non-text-type mini programs.

The text-type mini program refers to a mini program from which a text-type answer may be obtained, such as a weather mini program. If a question is "weather in Beijing", a result that the mini program may provide is a text, such as "sunny, 10 degrees Celsius". The non-text-type mini program refers to a mini program that directly provides a jump page for a question instead of an answer, such as a ticket booking mini program or a music playing mini program.

The text feature may be at least one of a keyword, a word frequency count, and a message matching degree. The non-text feature may be at least one of a quality score, a quantity of followers, and a quantity of times that a mini program is opened. In this embodiment, text features and non-text features need to be extracted for text-type mini programs, and non-text features need to be extracted for non-text-type mini programs. The backend server may sort the candidate mini programs according to the program features, to determine the target mini program.

Figure 10:
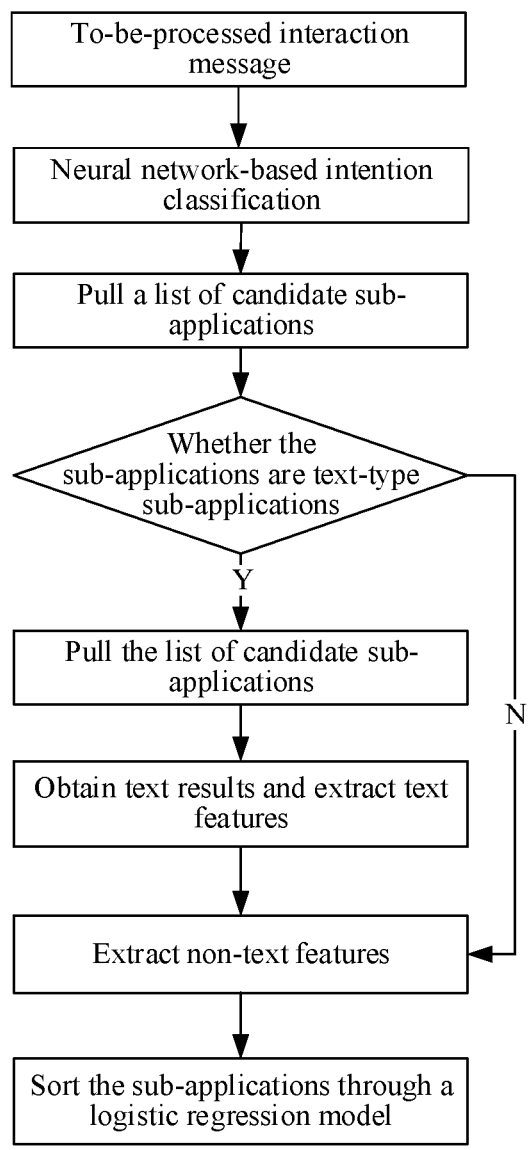
FIG. 10 is a partial flowchart of an interaction message processing method according to some embodiments of this application.

In another exemplary embodiment, as shown in FIG. 10, after receiving the to-be-processed interaction message, the backend server of the target service platform performs intention classification on the to-be-processed interaction message based on a neural network model. An intention classification result further includes candidate mini program identifiers. The backend server pulls a list of candidate mini programs, and then determines whether the candidate mini programs are text-type mini programs. When the candidate mini programs are text-type mini programs, the backend server obtains text results of the candidate mini programs, extracts text features of the candidate mini programs according to the text results, and then extracts non-text features of the candidate mini programs. When the candidate mini programs are non-text-type mini programs, the backend server obtains non-text features of the candidate mini programs. The backend server sorts the candidate mini programs according to the text features and the non-text features by using a logistic regression model, to determine the target mini program.

Based on the above, according to the exemplary embodiment provided in this application, the backend server extracts text features and non-text features for the text-type mini programs at the same time, and extracts non-text features for the non-text-type mini programs. In this way, various factors are taken into comprehensive consideration as much as possible, and a sorting result may be more accurate. In this way, the backend server can determine a target mini program that better meets the user requirement to improve user satisfaction, thereby further improving user stickiness.

Figure 11:
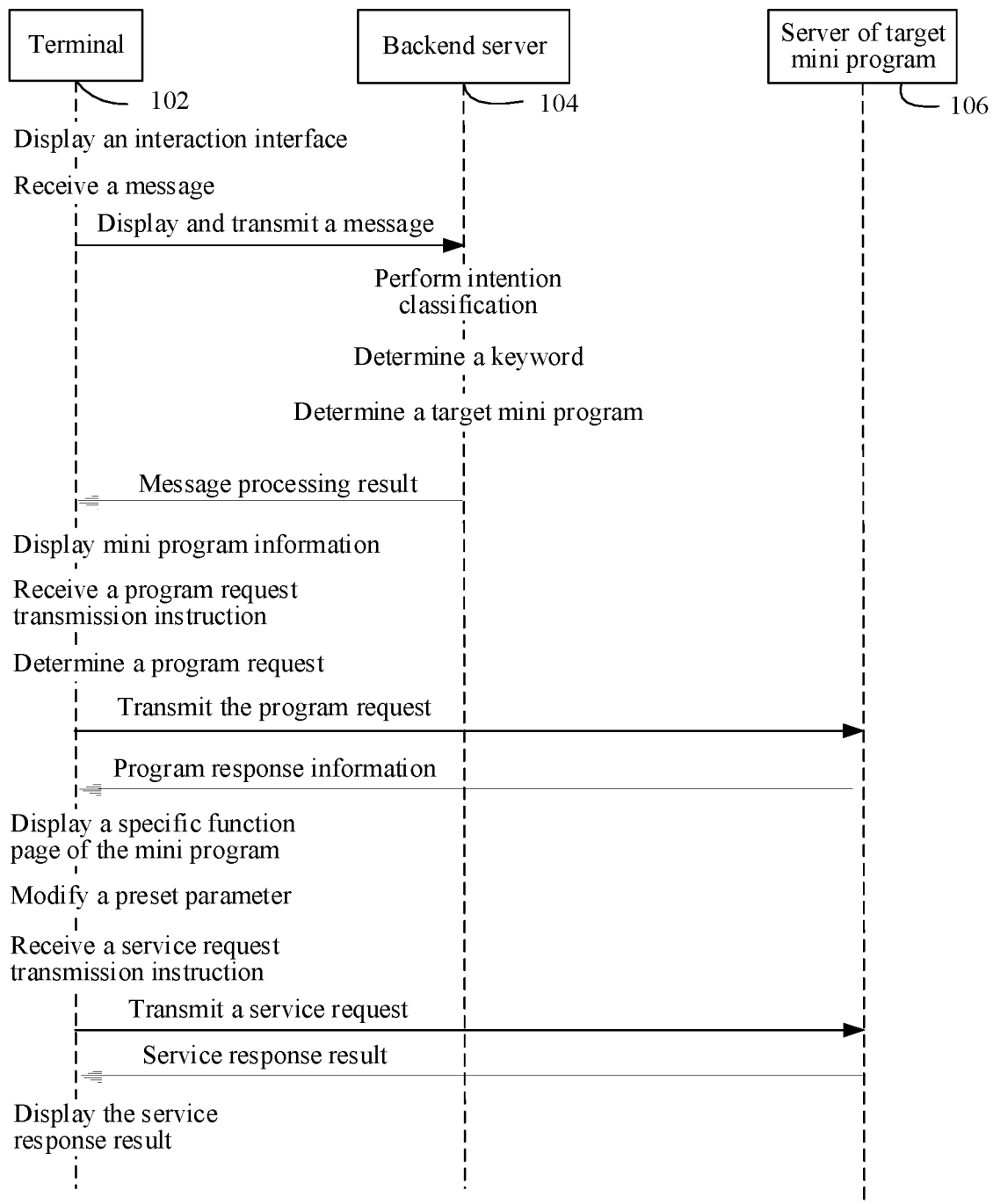
FIG. 11 is a sequence diagram of an interaction message processing method according to some embodiments of this application.

To describe the embodiments on the terminal side and on the backend server side of this application more clearly, description is made below with reference to a sequence diagram of a specific embodiment. The sequence diagram is shown in FIG. 11.

A terminal displays a target interaction interface, and receives a to-be-processed interaction message when a message input trigger instruction is received in the target interaction interface; and the terminal displays the to-be-processed interaction message in the target interaction interface when a message transmission trigger instruction is received in the target interaction interface, and transmits a message processing request to a backend server based on the to-be-processed interaction message.

The backend server receives the to-be-processed interaction message; the backend server performs intention classification on the to-be-processed interaction message to obtain an intention classification result of the to-be-processed interaction message; the backend server performs semantic analysis on the to-be-processed interaction message to determine a message keyword of the to-be-processed interaction message when the intention classification result includes a mini program intention; the backend server determines a program identifier of a target mini program corresponding to the to-be-processed interaction message according to the message keyword; and the backend server transmits a message processing result to the terminal based on the program identifier of the target mini program.

The terminal receives the message processing result returned based on the message processing request, and displays program information based on the target mini program in the target interaction interface according to the message processing result; the terminal receives a program request transmission instruction based on the displayed program information; and the terminal then transmits a target program request to a server of the target mini program according to the program information of the target mini program carried in the program request transmission instruction.

The server of the target mini program returns program response information to the terminal according to the target program request.

The terminal displays target page data according to the program response information, and receives a parameter modification instruction based on the displayed target page data; the terminal receives a service request transmission instruction based on the program response information after modifying a preset parameter according to the parameter modification instruction, the service request transmission instruction including invoked interface information and the modified preset parameter of the target mini program; and the terminal then transmits a target service request to the server of the target mini program according to the modified preset parameter and the invoked interface information.

The server of the target mini program returns a service response result to the terminal according to the target service request.

The terminal receives the service response result returned according to the target service request.

The terminal displays the service response result returned according to the target service request.

It is to be understood that, the steps in FIG. 2 and FIG. 5 are sequentially displayed as indicated by arrows, but the steps are not necessarily performed in a sequence indicated by the arrows. Unless otherwise explicitly specified in this application, execution of the steps is not strictly limited, and the steps may be performed in other sequences. Moreover, at least some of the steps in FIG. 2 and FIG. 5 may include a plurality of sub-steps or a plurality of stages. These sub-steps or stages are not necessarily performed at the same moment, but may be performed at different moments. These sub-steps or stages are not necessarily performed sequentially, but may be performed in turn or alternately with at least one part of other steps or sub-steps or stages of the other steps.

Figure 12:
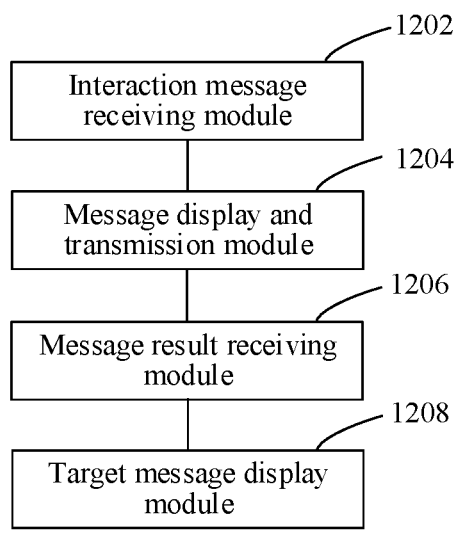
FIG. 12 is a structural block diagram of an interaction message processing apparatus according to some embodiments of this application.

In another embodiment, as shown in FIG. 12, an interaction message processing apparatus corresponding to the interaction message processing method run in a terminal is provided, including:

an interaction message receiving module 1202, configured to receive a to-be-processed interaction message when a message input trigger instruction is received in a target interaction interface;

a message display and transmission module 1204, configured to display the to-be-processed interaction message in the target interaction interface when a message transmission trigger instruction is received in the target interaction interface, and transmit a message processing request based on the to-be-processed interaction message;

a message result receiving module 1206, configured to receive a message processing result returned based on the message processing request, the message processing result being determined based on a target mini program corresponding to the to-be-processed interaction message; and a target message display module 1208, configured to display a target interaction message based on the target mini program in the target interaction interface according to the message processing result.

The interaction message processing apparatus receives a to-be-processed interaction message when a message input trigger instruction is received in a target interaction interface; displays the to-be-processed interaction message in the target interaction interface when a message transmission trigger instruction is received in the target interaction interface, and transmits a message processing request based on the to-be-processed interaction message; receives a message processing result returned based on the message processing request, the message processing result being determined based on a target mini program corresponding to the to-be-processed interaction message; and displays a target interaction message based on the target mini program in the target interaction interface according to the message processing result. The returned message processing result based on the target mini program may be received, and the target interaction message based on the target mini program may be displayed in the target interaction interface based on the message processing result, so that an interaction message processing function can be expanded and user stickiness can be increased. Besides, due to the limitation of mini program obtaining manners, according to the interaction message processing apparatus, the quantity of uses of the mini program can be improved. In addition, a closed-loop of operations is easily formed based on the interaction message processing apparatus in this embodiment, which helps to collect statistics on traffic revenue.

In another exemplary embodiment, the message processing result includes program information of the target mini program; and the target message display module 1208 is configured to display the target interaction message based on the target mini program in the target interaction interface according to the program information of the target mini program.

In another exemplary embodiment, the program information includes program link information of the target mini program; and the target message display module 1208 is configured to display the target interaction message based on the target mini program in the target interaction interface according to the program link information of the target mini program.

In another exemplary embodiment, the program information includes invoked interface information of the target mini program, and the invoked interface information corresponds to the to-be-processed interaction message; and the target message display module 1208 is configured to display the target interaction message based on the target mini program in the target interaction interface according to the invoked interface information of the target mini program.

In another exemplary embodiment, the message processing result further includes page data of the target mini program; and the target message display module 1208 is configured to determine the target interaction message based on the target mini program according to the program information and the page data of the target mini program; and display the target interaction message in the target interaction interface.

In another exemplary embodiment, the page data includes homepage data of the target mini program; and the target message display module 1208 is configured to render the homepage data, display a homepage of the target mini program in the target interaction interface, and set a hyperlink of the homepage according to program link information of the target mini program.

In another exemplary embodiment, the page data includes target page data of the target mini program, the target page data corresponds to invoked interface information of the target mini program, and the invoked interface information corresponds to the to-be-processed interaction message; and the target message display module 1208 is configured to render the target page data, display a target page of the target mini program in the target interaction interface, and set a hyperlink of the target page according to the invoked interface information of the target mini program.

In another exemplary embodiment, the apparatus further includes:
- a service request receiving module, configured to receive a service request transmission instruction based on the target page, the service request transmission instruction including the program information and a preset parameter of the target mini program;
- a service request determining module, configured to transmit a target service request according to the program information and the preset parameter; and
- a service response receiving module, configured to receive a service response result returned based on the target service request, and display the service response result returned based on the target service request.

In another exemplary embodiment, the target message display module 1208 is configured to display the page data on a subpage embedded in the target interaction interface, and set a hyperlink of the page data according to the program information of the target mini program.

In another exemplary embodiment, the apparatus further includes:
- a program request receiving module, configured to receive a program request transmission instruction based on the target interaction message;
- a program request transmission module, configured to transmit a target program request according to the program information of the target mini program carried in the program request transmission instruction; and
- a program response receiving module, configured to receive program response information returned according to the target program request, and display the program response information returned according to the target program request.

In another exemplary embodiment, the program response information includes the target page data, and the target page data corresponds to the to-be-processed interaction message; and the apparatus further includes:
- a service request receiving module, configured to receive a service request transmission instruction based on the program response information, the service request transmission instruction including the invoked interface information and the preset parameter of the target mini program;

a service request determining module, configured to transmit a target service request according to the preset parameter and the invoked interface information; and a service response receiving module, configured to receive a service response result returned according to the target service request, and display the service response result returned according to the target service request.

In another exemplary embodiment, the apparatus further includes a modification instruction receiving module, the modification instruction receiving module is configured to receive a parameter modification instruction based on the program response information; and the service request receiving module is further configured to receive the service request transmission instruction based on the program response information after modifying the preset parameter according to the parameter modification instruction, the service request transmission instruction including the invoked interface information and the modified preset parameter of the target mini program.

Figure 13:
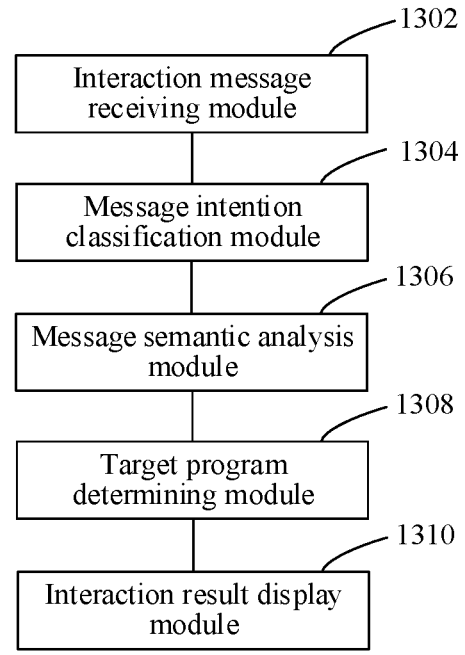
FIG. 13 is a structural block diagram of an interaction message processing apparatus according to some embodiments of this application.

In another exemplary embodiment, as shown in FIG. 13, an interaction message processing apparatus corresponding to the interaction message processing method run in a backend server is provided, including:

an interaction message receiving module 1302, configured to receive a to-be-processed interaction message;

a message intention classification module 1304, configured to perform intention classification on the to-be-processed interaction message, to obtain an intention classification result of the to-be-processed interaction message;

a message semantic analysis module 1306, configured to perform semantic analysis on the to-be-processed interaction message when the intention classification result includes a mini program intention, to determine a message keyword of the to-be-processed interaction message;

a target program determining module 1308, configured to determine a program identifier of a target mini program corresponding to the to-be-processed interaction message according to the message keyword; and a message result transmission module 1310, configured to transmit a message processing result based on the program identifier of the target mini program.

The interaction message processing apparatus receives a to-be-processed interaction message; performs intention classification on the to-be-processed interaction message, to obtain an intention classification result of the to-be-processed interaction message; performs semantic analysis on the to-be-processed interaction message, to determine a message keyword of the to-be-processed interaction message; determines a program identifier of a target mini program corresponding to the to-be-processed interaction message according to the message keyword; and transmits a message processing result based on the program identifier of the target mini program. The message processing result based on the target mini program may be fed back, so that an interaction message processing function can be expanded and user stickiness can be increased. Besides, due to the limitation of mini program obtaining manners, according to the interaction message processing apparatus, the quantity of uses of the target mini program can be improved. In addition, a closed-loop of operations is easily formed based on the interaction message processing apparatus in this embodiment, which helps to collect statistics on traffic revenue.

In another exemplary embodiment, the apparatus further includes a message feature extraction module, the message feature extraction module is configured to extract a message feature of the to-be-processed interaction message; and the message intention classification module 1304 is further configured to perform preset intention classification mapping on the message feature by using a neural network model, to obtain the intention classification result of the to-be-processed interaction message.

In another exemplary embodiment, the neural network model is a fully connected neural network model; and the message intention classification module 1304 is further configured to perform convolution mapping on the message feature by using a convolutional layer of the fully connected neural network model to obtain a convolution result; perform pooling mapping on the convolution result by using a pooling layer of the fully connected neural network model to obtain a pooling result; and perform fully connected mapping on the pooling result by using a fully connected layer of the fully connected neural network model, to obtain the intention classification result of the to-be-processed interaction message.

In another exemplary embodiment, the apparatus further includes a speech recognition module, the speech recognition module is configured to perform speech recognition on the to-be-processed interaction message to obtain a text message; and the message feature extraction module is further configured to extract a message feature of the text message.

In another exemplary embodiment, the apparatus further includes a program information determining module, the program information determining module is configured to obtain program information of the target mini program according to the program identifier, the program information including program link information or invoked interface information of the target mini program; and the message result transmission module 1310 is further configured to transmit the message processing result based on the program information.

In another exemplary embodiment, the apparatus further includes a page data requesting module, the page data requesting module is configured to request page data of the target mini program according to the program information; and the message result transmission module 1310 is further configured to transmit the message processing result based on the page data and the program information after receiving the page data.

In another exemplary embodiment, the apparatus further includes a candidate program determining module and a program feature extraction module, the candidate program determining module is configured to determine candidate mini programs corresponding to the to-be-processed interaction message according to the message keyword;

the program feature extraction module is configured to extract mini program features of the candidate mini programs; and the target program determining module 1308 is further configured to sort the candidate mini programs according to the mini program features, and determine a program identifier of a candidate mini program arranged at a preset position as the program identifier of the target mini program.

In another exemplary embodiment, the program feature extraction module is configured to extract text features of the candidate mini programs and non-text features of the candidate mini programs when the candidate mini programs are text-type mini programs; or extract non-text features of the candidate mini programs when the candidate mini programs are non-text-type mini programs.

Figure 14:
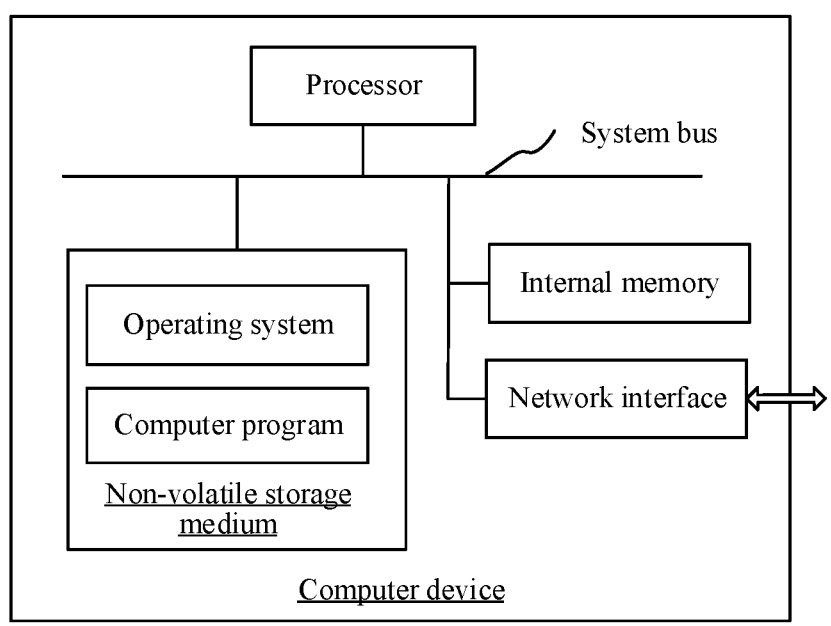
FIG. 14 is a schematic structural diagram of a computer device according to some embodiments of this application.

As shown in FIG. 14, in another embodiment, a computer device is provided. The computer device may be a server or a terminal. The computer device includes a processor, a memory, a network interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and a computer program. The internal memory provides an environment for running of the operating system and the computer program in the non-volatile storage medium. The network interface of the computer device is configured to communicate with an external terminal through a network connection. The computer program is executed by the processor to implement an interaction message processing method.

A person skilled in the art may understand that the structure shown in FIG. 14 is only a block diagram of a partial structure related to the solution of this application, and does not constitute a limitation to the computer device to which the solution of this application is applied. Specifically, the computer device may include more or fewer components than those shown in the figure, or some components may be combined, or a different component deployment may be used.

In another implementation, a computer device is provided. The computer device may be a server or a terminal. The computer device includes a memory and a processor, the memory storing a computer program, the processor, when executing the computer program, implementing the steps of the foregoing interaction message processing method.

In another exemplary implementation, a computer-readable storage medium is provided, storing a computer program, the computer program, when executed by a processor, implementing the steps of the foregoing interaction message processing method.

A person of ordinary skill in the art may understand that all or some of procedures of the method in the foregoing embodiments may be implemented by a computer program instructing relevant hardware. The program may be stored in a non-volatile computer-readable storage medium. When the program is executed, the procedures of the foregoing method embodiments may be implemented. References to the memory, the storage, the database, or other medium used in the embodiments provided in this application may all include a non-volatile or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a Rambus direct RAM (RDRAM), a direct Rambus dynamic RAM (DRDRAM), and a Rambus dynamic RAM (RDRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, and the description is relatively specific and detailed, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

As used herein, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The division of the foregoing functional modules is merely used as an example for description when the systems, devices, and apparatus provided in the foregoing embodiments performs interaction message processing. In practical application, the foregoing functions may be allocated to and completed by different functional modules according to requirements, that is, an inner structure of a device is divided into different functional modules to implement all or a part of the functions described above.

What is claimed is:

1. A method performed at a backend server, the method comprising:

receiving, by the server, a to-be-processed interaction message from a user interface of a social network platform;

performing intention classification on the to-be-processed interaction message, to obtain an intention classification result of the to-be-processed interaction message, including extracting a message feature of the to-be-processed interaction message; and performing preset intention classification mapping on the message feature using a neural network model to obtain the intention classification result of the to-be-processed interaction message;

performing semantic analysis on the to-be-processed interaction message when the intention classification result comprises a mini program intention, to determine a message keyword of the to-be-processed interaction message;

determining a program identifier of a target mini program corresponding to the to-be-processed interaction message according to the message keyword, wherein the target mini program is a sub-application that is used without being downloaded and installed, or the target mini program is automatically downloaded and installed in the background; and transmitting a message processing result based on the program identifier of the target mini program, wherein the neural network model is a fully connected neural network model, and performing preset intention classification mapping on the message feature by using a neural network model, to obtain the intention classification result of the to-be-processed interaction message comprises:

performing convolution mapping on the message feature by using a convolutional layer of the fully connected neural network model to obtain a convolution result;

performing pooling mapping on the convolution result by using a pooling layer of the fully connected neural network model to obtain a pooling result; and performing fully connected mapping on the pooling result by using a fully connected layer of the fully connected neural network model, to obtain the intention classification result of the to-be-processed interaction message.

2. The method according to claim 1, wherein extracting a message feature of the to-be-processed interaction message comprises:

performing speech recognition on the to-be-processed interaction message to obtain a text message; and extracting a message feature of the text message.

3. The method according to claim 1, wherein transmitting a message processing result based on the program identifier of the target mini program comprises:

obtaining program information of the target mini program according to the program identifier, the program information comprising program link information or invoked interface information of the target mini program; and transmitting the message processing result based on the program information.

4. The method according to claim 3, wherein the transmitting the message processing result based on the program information comprises:

requesting page data of the target mini program according to the program information; and transmitting the message processing result based on the page data and the program information after receiving the page data.

5. The method according to claim 1, wherein the determining a program identifier of a target mini program corresponding to the to-be-processed interaction message according to the message keyword comprises:

determining candidate mini programs corresponding to the to-be-processed interaction message according to the message keyword;

extracting mini program features of the candidate mini programs; and sorting the candidate mini programs according to the mini program features, and determining a program identifier of a candidate mini program arranged at a preset position as the program identifier of the target mini program.

6. The method according to claim 5, wherein the extracting mini program features of the candidate mini programs comprises:

extracting text features of the candidate mini programs and non-text features of the candidate mini programs in a case that the candidate mini programs are text-type mini programs; or extracting non-text features of the candidate mini programs in a case that the candidate mini programs are non-text-type mini programs.

7. A server, comprising:

one or more processors; and memory storing one or more programs, the one or more programs comprising instructions that, when executed by the one or more processors, cause the one or more processors to perform operations comprising:

receiving a to-be-processed interaction message from a user interface of a social network platform;

performing intention classification on the to-be-processed interaction message, to obtain an intention classification result of the to-be-processed interaction message, including extracting a message feature of the to-be-processed interaction message; and performing preset intention classification mapping on the message feature using a neural network model to obtain the intention classification result of the to-be-processed interaction message;

performing semantic analysis on the to-be-processed interaction message when the intention classification result comprises a mini program intention, to determine a message keyword of the to-be-processed interaction message;

determining a program identifier of a target mini program corresponding to the to-be-processed interaction message according to the message keyword, wherein the target mini program is a sub-application that is used without being downloaded and installed, or the target mini program is automatically downloaded and installed in the background; and transmitting a message processing result based on the program identifier of the target mini program, wherein the neural network model is a fully connected neural network model, and performing preset intention classification mapping on the message feature by using a neural network model, to obtain the intention classification result of the to-be-processed interaction message comprises:

performing convolution mapping on the message feature by using a convolutional layer of the fully connected neural network model to obtain a convolution result;

performing pooling mapping on the convolution result by using a pooling layer of the fully connected neural network model to obtain a pooling result; and performing fully connected mapping on the pooling result by using a fully connected layer of the fully connected neural network model, to obtain the intention classification result of the to-be-processed interaction message.

8. The server according to claim 7, wherein transmitting a message processing result based on the program identifier of the target mini program comprises:

obtaining program information of the target mini program according to the program identifier, the program information comprising program link information or invoked interface information of the target mini program; and transmitting the message processing result based on the program information.

9. The server according to claim 8, wherein transmitting the message processing result based on the program information comprises:

requesting page data of the target mini program according to the program information; and transmitting the message processing result based on the page data and the program information after receiving the page data.

10. The server according to claim 7, wherein determining a program identifier of a target mini program corresponding to the to-be-processed interaction message according to the message keyword comprises:

determining candidate mini programs corresponding to the to-be-processed interaction message according to the message keyword;

extracting mini program features of the candidate mini programs; and sorting the candidate mini programs according to the mini program features, and determining a program identifier of a candidate mini program arranged at a preset position as the program identifier of the target mini program.

11. The server according to claim 7, wherein determining a program identifier of a target mini program corresponding to the to-be-processed interaction message according to the message keyword comprises:

determining candidate mini programs corresponding to the to-be-processed interaction message according to the message keyword;

extracting mini program features of the candidate mini programs; and sorting the candidate mini programs according to the mini program features, and determining a program identifier of a candidate mini program arranged at a preset position as the program identifier of the target mini program.

12. The server according to claim 11, wherein extracting mini program features of the candidate mini programs comprises:

extracting text features of the candidate mini programs and non-text features of the candidate mini programs in a case that the candidate mini programs are text-type mini programs; or extracting non-text features of the candidate mini programs in a case that the candidate mini programs are non-text-type mini programs.

13. A non-transitory computer-readable storage medium having instructions stored thereon, the instructions when executed by one or more processors, cause the one or more processors to perform operations comprising:

receiving a to-be-processed interaction message from a user interface of a social network platform;

performing intention classification on the to-be-processed interaction message, to obtain an intention classification result of the to-be-processed interaction message, including extracting a message feature of the to-be-processed interaction message; and performing preset intention classification mapping on the message feature using a neural network model to obtain the intention classification result of the to-be-processed interaction message;

performing semantic analysis on the to-be-processed interaction message when the intention classification result comprises a mini program intention, to determine a message keyword of the to-be-processed interaction message;

determining a program identifier of a target mini program corresponding to the to-be-processed interaction message according to the message keyword, wherein the target mini program is a sub-application that is used without being downloaded and installed, or the target mini program is automatically downloaded and installed in the background; and transmitting a message processing result based on the program identifier of the target mini program, wherein the neural network model is a fully connected neural network model, and performing preset intention classification mapping on the message feature by using a neural network model, to obtain the intention classification result of the to-be-processed interaction message comprises:

performing convolution mapping on the message feature by using a convolutional layer of the fully connected neural network model to obtain a convolution result;

performing pooling mapping on the convolution result by using a pooling layer of the fully connected neural network model to obtain a pooling result; and performing fully connected mapping on the pooling result by using a fully connected layer of the fully connected neural network model, to obtain the intention classification result of the to-be-processed interaction message.

14. The non-transitory computer-readable storage medium according to claim 13, wherein transmitting a message processing result based on the program identifier of the target mini program comprises:

obtaining program information of the target mini program according to the program identifier, the program information comprising program link information or invoked interface information of the target mini program; and transmitting the message processing result based on the program information.

* * * * *